US012789179B2

(12) United States Patent
Krasheninin et al.

(10) Patent No.: US 12,789,179 B2
(45) Date of Patent: Nov. 10, 2026

(54) LAB TOOLS AND LABORATORY LIQUID HANDLING SYSTEMS AND METHODS INCLUDING SAME

(71) Applicant: Revvity Health Sciences, Inc., Waltham, MA (US)

(72) Inventors: Vladimir Krasheninin, Upton, MA (US); Traci Lipman, Hopkinton, MA (US)

(73) Assignee: REVVITY HEALTH SCIENCES, INC., Waltham, MA (US)

( * ) Notice: Subject to any disclaimer, the term of this patent is extended or adjusted under 35 U.S.C. 154(b) by 456 days.

(21) Appl. No.: 18/495,459

(22) Filed: Oct. 26, 2023

(65) Prior Publication Data

US 2025/0135450 A1 May 1, 2025

(51) Int. Cl.
*B01L 3/02* (2006.01)

(52) U.S. Cl.
CPC .................................. *B01L 3/0237* (2013.01)

(58) Field of Classification Search
None
See application file for complete search history.

(56) References Cited

U.S. PATENT DOCUMENTS 3,444,742 A 5/1969 Ellis et al.
3,657,694 A 4/1972 Lindsey
3,855,868 A 12/1974 Sudvaniemi
4,389,374 A 6/1983 Sutton et al.
4,830,832 A 5/1989 Arpagaus et al.
4,967,604 A * 11/1990 Arpagaus ........... G01N 35/1067 422/932
5,365,783 A 11/1994 Zweifel
(Continued)

FOREIGN PATENT DOCUMENTS

EP 0571100 A1 11/1993
EP 1443330 A1 8/2004
(Continued)

OTHER PUBLICATIONS

"Hamilton Pipetting Technologies and the Hamilton CO-RE Tips" https://www.hamiltoncompany.com/automated-liquid-handling/consumables/platform-consumables/coreii/hamilton-pipetting-technologies-and-the-hamilton-co-re-tip (Retrieved Date: Nov. 28, 2023).
(Continued)

*Primary Examiner* — Brian R Gordon
(74) *Attorney, Agent, or Firm* — Myers Bigel, P.A.

(57) ABSTRACT

A laboratory liquid handling system includes a pipetting module, a lab tool, and a drive system. The pipetting module includes first and second pipettors each including a pipettor shaft and a fluid passage extending through the pipettor shaft and terminating at an orifice at an end of the pipettor shaft. The lab tool includes at least one integral adapter structure and an integral active effector. The adapter structure(s) is/are configured to engage the first pipettor shaft and to releasably secure the lab tool to the first pipettor shaft. The drive system is operable to: engage the first pipettor shaft with the adapter structure(s) to secure the lab tool to the pipetting module; move the pipetting module to transport the lab tool; operate the active effector using the second pipettor shaft; and disengage the first pipettor shaft from the adapter structure(s) to thereby release the lab tool from the pipetting module.

17 Claims, 14 Drawing Sheets

(56) References Cited

U.S. PATENT DOCUMENTS

| | | | | |
|---|---|---|---|---|
| 5,487,997 | A | 1/1996 | Stolp | |
| 5,496,473 | A | 3/1996 | Chow | |
| 5,525,302 | A | 6/1996 | Astle | |
| 5,639,425 | A * | 6/1997 | Komiyama | G01N 35/0099 422/65 |
| 5,651,941 | A | 7/1997 | Stark et al. | |
| 5,916,527 | A | 6/1999 | Haswell | |
| 5,961,927 | A | 10/1999 | Isaacs et al. | |
| 6,019,225 | A | 2/2000 | Kalmakis et al. | |
| 6,156,275 | A | 12/2000 | Dumitrescu et al. | |
| 6,182,719 | B1 | 2/2001 | Yahiro | |
| 6,203,760 | B1 | 3/2001 | Van et al. | |
| 6,253,807 | B1 | 7/2001 | Jones | |
| 6,299,840 | B1 * | 10/2001 | Watanabe | G01N 35/0099 422/50 |
| 6,417,007 | B1 | 7/2002 | Gittleman et al. | |
| 6,589,483 | B1 | 7/2003 | Maeda | |
| 7,018,587 | B2 | 3/2006 | Heath et al. | |
| 7,169,361 | B2 | 1/2007 | Arnold et al. | |
| 7,191,647 | B2 | 3/2007 | Harazin et al. | |
| 7,220,590 | B2 | 5/2007 | Moritz et al. | |
| 7,314,598 | B2 | 1/2008 | Nishino | |
| 7,411,508 | B2 | 8/2008 | Harazin et al. | |
| 7,513,857 | B2 | 4/2009 | Gueller et al. | |
| 7,635,326 | B2 | 12/2009 | Gueller et al. | |
| 7,858,041 | B2 | 12/2010 | Muraishi et al. | |
| 7,988,934 | B2 * | 8/2011 | Balmer | G01N 35/0099 422/63 |
| 8,021,611 | B2 | 9/2011 | Roach et al. | |
| 8,057,756 | B2 | 11/2011 | Londo et al. | |
| 8,192,698 | B2 | 6/2012 | Londo et al. | |
| 8,287,820 | B2 | 10/2012 | Williams et al. | |
| 8,377,396 | B2 | 2/2013 | Meinicke et al. | |
| 8,398,941 | B2 | 3/2013 | Sinclair et al. | |
| 8,602,470 | B2 | 12/2013 | Bieler | |
| 8,809,069 | B2 | 8/2014 | Brady et al. | |
| 9,073,052 | B2 | 7/2015 | Maslana et al. | |
| 9,259,737 | B2 | 2/2016 | Brady et al. | |
| 9,283,557 | B2 | 3/2016 | Maslana et al. | |
| 9,977,042 | B2 * | 5/2018 | Ito | G01N 35/1002 |
| 10,065,325 | B2 * | 9/2018 | Buchloh | B25J 15/0608 |
| 10,105,852 | B2 * | 10/2018 | Buchloh | G01N 35/0099 |
| 10,940,592 | B2 * | 3/2021 | Buchloh | G01N 35/0099 |
| 10,942,193 | B2 | 3/2021 | Voss et al. | |
| 11,065,614 | B2 * | 7/2021 | Guzman | B01L 3/0275 |
| 11,098,343 | B2 * | 8/2021 | Buse | B01L 3/50825 |
| 11,167,424 | B2 * | 11/2021 | Buchloh | B25J 15/008 |
| 11,559,802 | B2 * | 1/2023 | Cote | B01L 3/5025 |
| 11,684,926 | B2 * | 6/2023 | Vahidi | B01L 9/54 435/7.23 |
| 12,048,924 | B2 * | 7/2024 | Krasheninin | B01L 3/0275 |
| 2001/0018031 | A1 | 8/2001 | Steiner | |
| 2001/0028863 | A1 | 10/2001 | Kitagawa | |
| 2002/0095998 | A1 | 7/2002 | Kriz et al. | |
| 2003/0017084 | A1 | 1/2003 | Dale et al. | |
| 2003/0215365 | A1 | 11/2003 | Sevigny et al. | |
| 2004/0067170 | A1 | 4/2004 | Higuchi | |
| 2004/0069076 | A1 | 4/2004 | Gamble | |
| 2004/0070225 | A1 | 4/2004 | Meinicke et al. | |
| 2004/0071602 | A1 * | 4/2004 | Yiu | B01L 3/0279 422/922 |
| 2004/0208793 | A1 * | 10/2004 | Jarvimaki | B01L 3/0217 422/500 |
| 2005/0145048 | A1 | 7/2005 | Moir et al. | |
| 2005/0265900 | A1 * | 12/2005 | Gard | G01N 35/109 422/400 |
| 2006/0093530 | A1 | 5/2006 | Ueda | |
| 2007/0251341 | A1 * | 11/2007 | Balmer | G01N 35/1011 74/49 |
| 2007/0269853 | A1 | 11/2007 | Galiano | |
| 2008/0156117 | A1 | 7/2008 | Londo et al. | |
| 2008/0247914 | A1 | 10/2008 | Edens et al. | |
| 2009/0129978 | A1 | 5/2009 | Wilson et al. | |
| 2010/0226828 | A1 | 9/2010 | Itoh | |
| 2010/0267771 | A1 | 10/2010 | Bott et al. | |
| 2010/0313688 | A1 | 12/2010 | Hiltbrand | |
| 2012/0195800 | A1 * | 8/2012 | Clinton | B01L 3/50255 422/82.08 |
| 2012/0291872 | A1 | 11/2012 | Brady et al. | |
| 2013/0259635 | A1 * | 10/2013 | Maslana | G01N 35/0099 422/501 |
| 2015/0037803 | A1 * | 2/2015 | Park | G01N 35/0099 435/6.12 |
| 2015/0093754 | A1 * | 4/2015 | Asao | G01N 35/1011 435/6.12 |
| 2015/0239129 | A1 * | 8/2015 | Buchloh | B25J 15/008 294/99.1 |
| 2015/0239130 | A1 * | 8/2015 | Buchloh | G01N 35/10 294/212 |
| 2015/0251173 | A1 | 9/2015 | Maslana et al. | |
| 2017/0045542 | A1 * | 2/2017 | Lapham | G01N 35/0099 |
| 2017/0128932 | A1 * | 5/2017 | Ito | G01N 35/1016 |
| 2017/0131308 | A1 * | 5/2017 | Ito | G01N 35/109 |
| 2017/0153260 | A1 * | 6/2017 | Barmettler | G01N 35/00732 |
| 2017/0354965 | A1 * | 12/2017 | Cote | B01L 3/0217 |
| 2019/0030542 | A1 * | 1/2019 | Hedglin | B01L 3/0275 |
| 2019/0314808 | A1 * | 10/2019 | Wilmer | B01L 3/0275 |
| 2019/0336961 | A1 * | 11/2019 | Davis | B01L 9/543 |
| 2019/0369134 | A1 * | 12/2019 | Wu | G01N 1/28 |
| 2020/0330980 | A1 * | 10/2020 | Cote | B01L 3/0217 |
| 2021/0008543 | A1 * | 1/2021 | Vahidi | G01N 35/026 |
| 2021/0008565 | A1 * | 1/2021 | Vahidi | B01L 9/54 |
| 2021/0023550 | A1 * | 1/2021 | Guzman | B01L 3/0217 |
| 2021/0220833 | A1 | 7/2021 | Nissen et al. | |
| 2022/0091147 | A1 * | 3/2022 | Kurnianto | G01N 35/1016 |
| 2022/0152616 | A1 * | 5/2022 | Cote | B01L 3/0275 |
| 2022/0176571 | A1 | 6/2022 | Brennwald et al. | |
| 2023/0241600 | A1 * | 8/2023 | Fritschi | B01L 3/0279 422/501 |
| 2023/0405579 | A1 * | 12/2023 | Mckinley | G01N 35/0099 |
| 2024/0269664 | A1 * | 8/2024 | Gledhill | B01L 3/0227 |
| 2024/0307884 | A1 * | 9/2024 | Mauracher | B01L 3/0237 |

FOREIGN PATENT DOCUMENTS

| | | | |
|---|---|---|---|
| GB | 2431600 | A | 5/2007 |
| KR | 790001034 | B1 | 8/1979 |
| WO | 0008472 | A2 | 2/2000 |
| WO | 0025922 | A2 | 5/2000 |
| WO | 2005059567 | A1 | 6/2005 |
| WO | 2006083695 | A2 | 8/2006 |
| WO | 2010057629 | A2 | 5/2010 |
| WO | 2013052318 | A1 | 4/2013 |

OTHER PUBLICATIONS

"Hamilton Robotics: eSWAP Gripper," Hamilton Robotics, Retrieved Date: May 3, 2012, From URL: http://www.hamiltonrobotics.com/hamilton-robotics/liquidhandling/star/labware-manipulation-tools/swap-external-gripper/ (4 pages).

"Hamilton Robotics: iSWAP Microplate Gripper," Hamilton Robotics, Retrieved Date: May 3, 2012, From URL: http://www.hamiltonrobotics.com/hamilton-robotics/liquidhandling/star/labware-manipulation-tools/iswap-microplate-gripper/ (3 pages).

"Hamilton Robotics: Labware Manipulation Tools," Hamilton Robotics, Retrieved Date: May 3, 2012, From URL: http://www.hamiltonrobotics.com/hamilton-robotics/liquidhandling/star/labware-manipulation-tools/ (3 pages).

"Hamilton Robotics: Microplate Gripping CO-RE Grip," Hamilton Robotics, Retrieved Date: May 3, 2012, From URL: http://www.hamiltonrobotics.com/hamilton-robotics/liquidhandling/star/labware-manipulation-tools/microplate-co-re-grip/ (2 pages).

"JANUS® Automated Workstation from PerkinElmer—USA," PerkinElmer, Inc., Retrieved Date: Feb. 9, 2011, From URL: http:las.perkinelmer.com/Catalog/CategoryPage.htm?CategoryID=JANUS (2 pages).

"Plate-GripX" Xiral, Retrieved Date: Feb. 9, 2011, From URL: http://www.xiril.com/xiril/printable/products/optionsaccessories/plategripx/index.html (1 page).

(56) References Cited

OTHER PUBLICATIONS

"SPE Module—automated vacuum extraction" Xiral, Retrieved Date: May 3, 2012, From URL: http://www.xiril.com/xiril/printable/products/optionsaccessories/spemodule/index.html (1 page).
"VERSA Liquid Handling Systems Accessories & Modules" Aurora Biomed, Retrieved Date: Feb. 21, 2011, From URL: http://aurorabiomed.com/liquid-handling-accessories.htm (3 pages).
"Waters: Lid Assembly [M880877BC1]," Waters, Retrieved Date: Apr. 8, 2011, From URL: http://waters.com/waters/partDetail.htm?locale=en_US&partNumber=M880877BC1 (1 page).
Flaherty, N. (Apr. 23, 2009). JANUS Product Portfolio. PerkinElmer (26 pages).
International Search Report and the Written Opinion of the International Searching Authority corresponding to International Patent Application No. PCT/US2024/050321 (18 pages) (mailed Jan. 14, 2025).

* cited by examiner

LAB TOOLS AND LABORATORY LIQUID HANDLING SYSTEMS AND METHODS INCLUDING SAME

FIELD

The present technology relates to laboratory liquid handling systems and, more particularly, to lab tools for use in laboratory liquid handling systems and laboratory liquid handling systems and methods incorporating the same.

BACKGROUND

Laboratory liquid handling systems are used to transport and operate on volumes of liquid. For example, one or more liquid samples may be provided in containers (e.g., microwell plates or vials) in a liquid handling system. The liquid handling system may include one or more pipettors that are used to remove (e.g., by aspirating) portions of the samples from the containers and/or to add (e.g., by dispensing) material to the samples in the containers. In some cases, it may be desirable or necessary to move labware or tools within the system. It may be desirable or necessary to move labware or tools robotically and, in some cases, automatically and programmatically.

SUMMARY

According to some embodiments, a laboratory liquid handling system includes a pipetting module, a lab tool, and a drive system. The pipetting module includes first and second pipettors. The first pipettor includes a first pipettor shaft and a first fluid passage extending through the first pipettor shaft and terminating at a first orifice at an end of the first pipettor shaft. The second pipettor includes a second pipettor shaft and a second fluid passage extending through the second pipettor shaft and terminating at a second orifice at an end of the second pipettor shaft. The lab tool includes at least one integral adapter structure and an integral active effector. The at least one integral adapter structure is configured to engage the first pipettor shaft. The at least one adapter structure is configured to releasably secure the lab tool to the first pipettor shaft. The drive system is operable to: engage the first pipettor shaft with the at least one adapter structure to secure the lab tool to the pipetting module; move the pipetting module to transport the lab tool secured thereto; operate the active effector using the second pipettor shaft; and disengage the first pipettor shaft from the at least one adapter structure to thereby release the lab tool from the pipetting module.

According to some embodiments, the lab tool is a gripper module and the active effector is a gripper mechanism.

According to some embodiments, the gripper mechanism is a mechanical gripper mechanism.

In some embodiments, the gripper mechanism includes a gripper finger, and an actuator linkage operable to move the gripper finger between an open position and a closed position. The pipetting module is configured to selectively drive the second pipettor to displace the actuator linkage and thereby move the gripper finger between the open position and the closed position.

In some embodiments, the gripper mechanism includes a lever arm joined to the gripper finger, and the pipetting module is configured to selectively drive the second pipettor to displace the lever arm and thereby move the gripper finger between the open position and the closed position.

In some embodiments, the second pipettor includes a pipetting tip extending from the end of the second pipettor shaft, the actuator linkage includes an engagement feature configured to engage the second pipettor shaft when the second pipettor is driven to displace the actuator linkage to move the gripper finger between the open position and the closed position, and the engagement feature includes a tip receiving slot defined therein to receive the pipetting tip.

According to some embodiments, the gripper mechanism includes at least one spring that biases the gripper finger toward the closed position.

In some embodiments, the pipetting module includes a third pipettor including a third pipettor shaft, and a third fluid passage extending through the third pipettor shaft and terminating at a third orifice at an end of the third pipettor shaft. The gripper mechanism includes a second gripper finger, and a second actuator linkage operable to move the second gripper finger between an open position and a closed position. The pipetting module is configured to selectively drive the third pipettor to displace the second actuator linkage and thereby move the second gripper finger between its open position and its closed position.

According to some embodiments, the laboratory liquid handling system includes a locator dock configured to support the lab tool and positively locate the lab tool relative to the laboratory liquid handling system.

According to some embodiments, the at least one adapter structure includes an interlock feature configured to laterally receive and interlock with the first pipettor shaft to releasably secure the lab tool to the first pipettor shaft, and the drive system is operable to: move the first pipettor shaft laterally relative to the interlock feature to engage the first pipettor shaft with the interlock feature to secure the lab tool to the pipetting module; and move the first pipettor shaft laterally relative to the interlock feature to disengage the first pipettor shaft from the interlock feature to thereby release the lab tool from the pipetting module.

In some embodiments, the pipetting module includes a third pipettor including a third pipettor shaft and a third fluid passage extending through the third pipettor shaft and terminating at a third orifice at an end of the third pipettor shaft. The at least one adapter structure includes a second interlock feature configured to laterally receive and interlock with the third pipettor shaft to releasably secure the lab tool to the third pipettor shaft. The drive system is operable to: move the third pipettor shaft laterally relative to the second interlock feature to engage the third pipettor shaft with the second interlock feature to secure the lab tool to the pipetting module; and move the third pipettor shaft laterally relative to the second interlock feature to disengage the third pipettor shaft from the second interlock feature to thereby release the lab tool from the pipetting module.

In some embodiments, the first pipettor includes a pipettor interlock feature on the first pipettor shaft configured to interlock with the interlock feature of the at least one adapter structure to releasably secure the lab tool to the first pipettor shaft.

In some embodiments, the pipettor interlock feature includes an annular rib.

According to some embodiments, the laboratory liquid handling system includes a liquid handler fluidly connected to the first and second orifices and operable to dispense and/or aspirate a liquid through the first and second orifices.

According to some embodiments, the drive system includes at least one motor, and a controller programmed with instructions to cause the at least one motor to: engage the first pipettor shaft with the at least one adapter structure to secure the lab tool to the pipetting module; move the pipetting module to transport the lab tool secured thereto; operate the active effector using the second pipettor shaft; and disengage the first pipettor shaft from the at least one adapter structure to thereby release the lab tool from the pipetting module.

According to some embodiments, the gripper mechanism includes a gripper finger and an actuator linkage operable to move the gripper finger between an open position and a closed position. The pipetting module is configured to selectively drive the second pipettor to displace the actuator linkage and thereby move the gripper finger between the open position and the closed position. The second pipettor includes a pipetting tip extending from the end of the second pipettor shaft. The actuator linkage includes an engagement feature configured to engage the second pipettor shaft when the second pipettor is driven to displace the actuator linkage to move the gripper finger between the open position and the closed position. The engagement feature includes a tip receiving slot defined therein to receive the pipetting tip. The at least one adapter structure includes an interlock feature configured to laterally receive and interlock with the first pipettor shaft to releasably secure the lab tool to the first pipettor shaft. The drive system is operable to: move the first pipettor shaft laterally relative to the interlock feature to engage the first pipettor shaft with the interlock feature to secure the lab tool to the pipetting module; and move the first pipettor shaft laterally relative to the interlock feature to disengage the first pipettor shaft from the interlock feature to thereby release the lab tool from the pipetting module. The laboratory liquid handling system includes a liquid handler fluidly connected to the first and second orifices and operable to dispense and/or aspirate a liquid through the first and second orifices. The drive system includes at least one motor, and a controller programmed with instructions to cause the at least one motor to: engage the first pipettor shaft with the at least one adapter structure to secure the lab tool to the pipetting module; move the pipetting module to transport the lab tool secured thereto; operate the active effector using the second pipettor shaft; and disengage the first pipettor shaft from the at least one adapter structure to thereby release the lab tool from the pipetting module.

In some embodiments, the pipetting module includes a third pipettor including a third pipettor shaft, and a third fluid passage extending through the third pipettor shaft and terminating at a third orifice at an end of the third pipettor shaft. The at least one adapter structure includes a second interlock feature configured to laterally receive and interlock with the third pipettor shaft to releasably secure the lab tool to the third pipettor shaft. The drive system is operable to: move the third pipettor shaft laterally relative to the second interlock feature to engage the third pipettor shaft with the second interlock feature to secure the lab tool to the pipetting module; and move the third pipettor shaft laterally relative to the second interlock feature to disengage the third pipettor shaft from the second interlock feature to thereby release the lab tool from the pipetting module.

In some embodiments, the pipetting module includes a third pipettor including a third pipettor shaft, and a third fluid passage extending through the third pipettor shaft and terminating at a third orifice at an end of the third pipettor shaft. The gripper mechanism includes a second gripper finger, and a second actuator linkage operable to move the second gripper finger between an open position and a closed position. The pipetting module is configured to selectively drive the third pipettor to displace the second actuator linkage and thereby move the second gripper finger between its open position and its closed position.

According to some embodiments, a method for using a laboratory liquid handling system including a pipetting module and a drive system, the pipetting module including a first pipettor and a second pipettor, the first pipettor including a first pipettor shaft and a first fluid passage extending through the first pipettor shaft and terminating at a first orifice at an end of the first pipettor shaft, and the second pipettor including a second pipettor shaft and a second fluid passage extending through the second pipettor shaft and terminating at a second orifice at an end of the second pipettor shaft, includes providing a lab tool including: at least one integral adapter structure configured to engage the first pipettor shaft, wherein the at least one adapter structure is configured to releasably secure the lab tool to the first pipettor shaft; and an integral active effector. The method further includes operating the drive system to: engage the first pipettor shaft with the at least one adapter structure to secure the lab tool to the pipetting module; move the pipetting module to transport the lab tool secured thereto; operate the active effector using the second pipettor shaft; and disengage the first pipettor shaft from the at least one adapter structure to thereby release the lab tool from the pipetting module.

According to some embodiments, a lab tool for use in a laboratory liquid handling system, the laboratory liquid handling system including a pipetting module and a drive system, the pipetting module including a first pipettor and a second pipettor, the first pipettor including a first pipettor shaft and a first fluid passage extending through the first pipettor shaft and terminating at a first orifice at an end of the first pipettor shaft, and the second pipettor including a second pipettor shaft and a second fluid passage extending through the second pipettor shaft and terminating at a second orifice at an end of the second pipettor shaft, includes: at least one integral adapter structure configured to engage the first pipettor shaft, wherein the at least one adapter structure is configured to releasably secure the lab tool to the first pipettor shaft; and an integral active effector selectively operable using the second pipettor shaft.

BRIEF DESCRIPTION OF THE DRAWINGS

The accompanying drawings, which form a part of the specification, illustrate embodiments of the technology.

DETAILED DESCRIPTION

Figure 1:
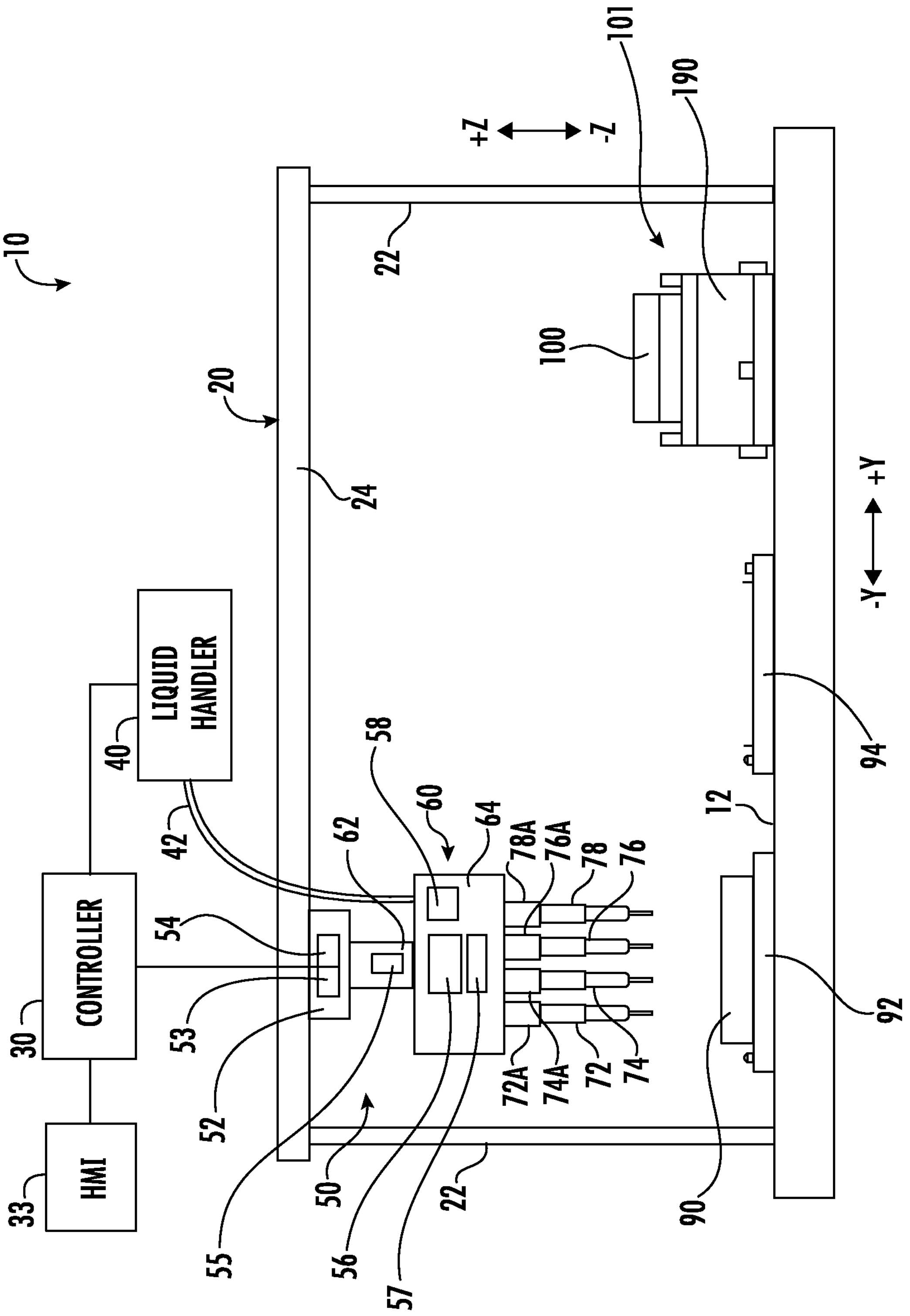
FIG. 1 is a schematic diagram of a laboratory liquid handling system including a gripper system according to embodiments of the present technology.

With reference to FIGS. 1-14, a lab tool system 101 according to some embodiments of the present technology is shown therein. The lab tool system 101 forms a part of a laboratory liquid handling system 10 (FIG. 1) according to embodiments of the present technology. The lab tool system 101 includes a modular lab tool 100 and, optionally, a locator dock 190. The modular lab tool 100 includes an integral active effector 151. In some embodiments (e.g., as illustrated and described herein), the integral active effector 151 is a gripper mechanism or gripping mechanism. The illustrated lab tool system, lab tool and integral active effector are referred to herein as the gripper system 101, the gripper tool 100, and the gripping mechanism 151.

With reference to FIG. 1, the laboratory liquid handling system 10 as illustrated includes a platform or deck 12, a frame 20, a controller 30, a human machine interface (HMI) 33, a liquid handler 40, a drive system 50, a pipetting gantry or module 60, and labware holders 92, 94. A lab object 90 is disposed on the deck 12. The lab object 90 may include, for example, labware such as a microwell plate, a rack containing one or more vials or another suitable type of liquid container or receptacle.

The frame 20 includes supports 22 and one or more conveyor rails 24. The drive system 50 includes a shuttle or carrier 52 and drive actuators 53, 54, 55, 56, 57, and 58. The carrier 52 operatively is mounted on the rail(s) 24 to enable the carrier 52 to move relative to the deck 12. According to some embodiments, the carrier 52 has freedom of movement in at least two lateral degrees (i.e., in an X dimension and a Y dimension). The pipetting module 60 is coupled to and suspended from the carrier 52 by an extension arm 62 such that the pipetting module 60 moves with the carrier 52. The carrier 52 can be driven by the actuator 53 in the X dimension and by the actuator 54 in the Y dimension under the control of the controller 30. The pipetting module 60 can be further movable in a Z dimension by the actuator(s) 55 under the control of the controller 30. In some embodiments, the actuator(s) 56, 57 and 58 may be provided to move or reposition further components of the pipetting module 60 under the control of the controller 30 as described below. Each of the actuators 53, 54, 55, 56, 57, and 58 may include a motor or motors (e.g., electric motors) and may also include suitable linkages. In some embodiments, each of the actuators 53, 54, 55, 56, 57, and 58 includes a motor.

The liquid handler 40 may be any suitable apparatus that can aspirate and/or dispense a desired amount of a liquid from or into a container. The liquid handler 40 may include, for example, a syringe or pump fluidly connected to the pipetting module 60 by one or more lengths of tubing 42. The liquid handler 40 may be controlled by the controller 30.

With reference to FIG. 1, the pipetting module 60 includes a housing 64 connected to the lower end of the extension arm 62. The pipetting module 60 further includes four pipettors 72, 74, 76 and 78 each coupled to the housing 64 by a respective actuator assembly 72A, 74A, 76A, 78A. The actuator 56 is provided to control the relative positions of the pipettors 72, 74, 76, 78 along the Y axis. The actuators 57 are provided to control the relative positions of the pipettors 72, 74, 76, 78 along the Z axis. As discussed herein, pipetting modules having more or fewer pipettors and actuators may be employed in some embodiments.

Figure 2:
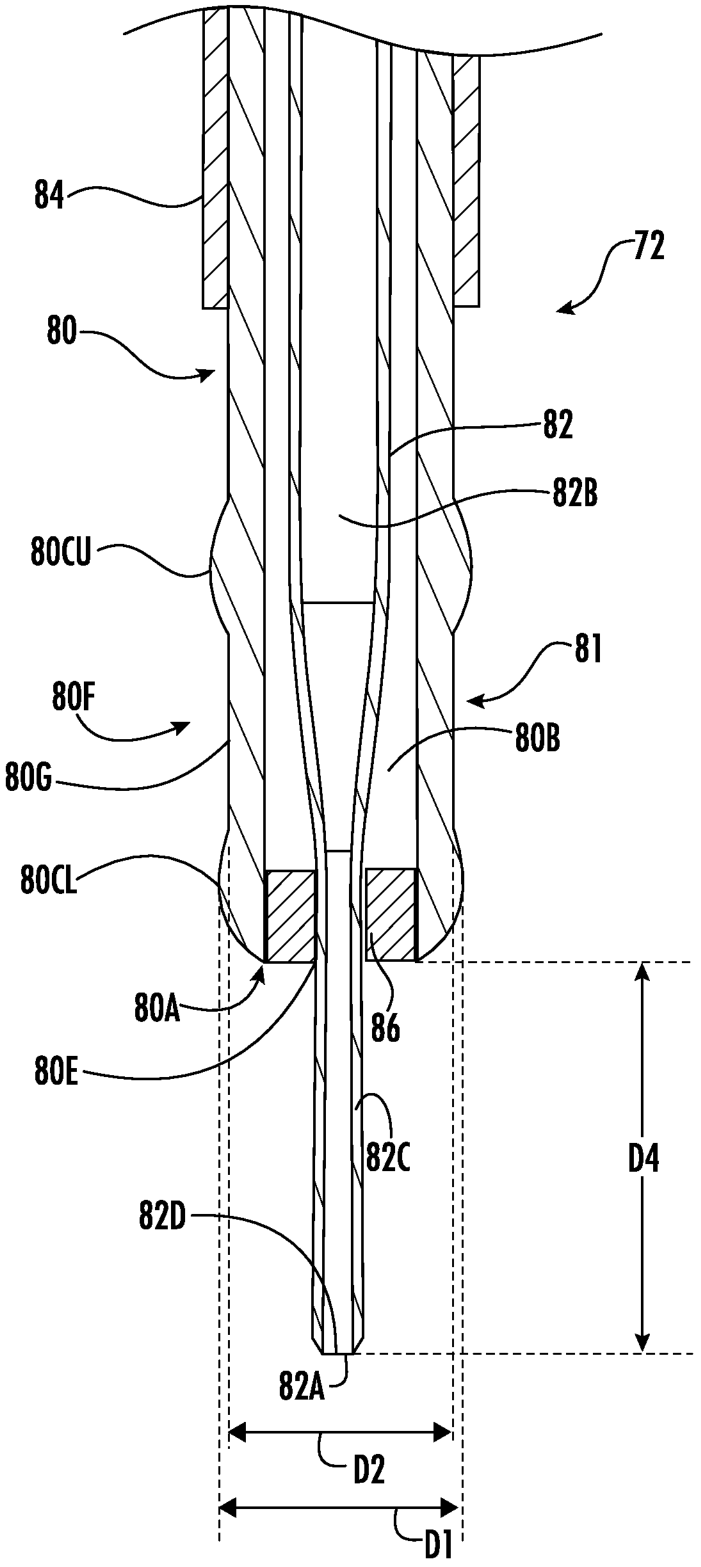
FIG. 2 is a cross-sectional view of a pipettor forming a part of the laboratory liquid handling system of FIG. 1.
Figure 3:
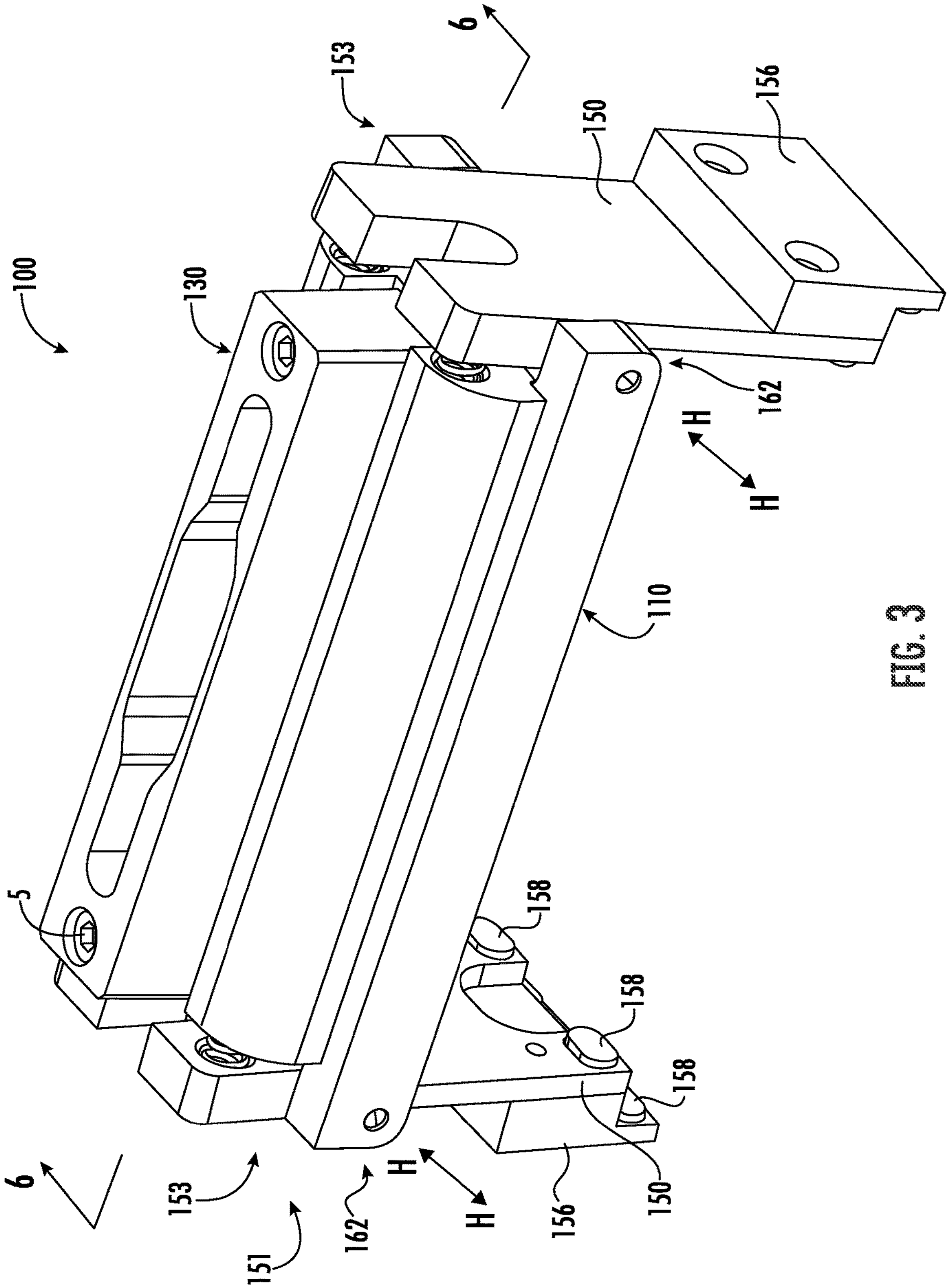
FIG. 3 a top perspective view of a gripper tool forming a part of the laboratory liquid handling system of FIG. 1.
Figure 4:
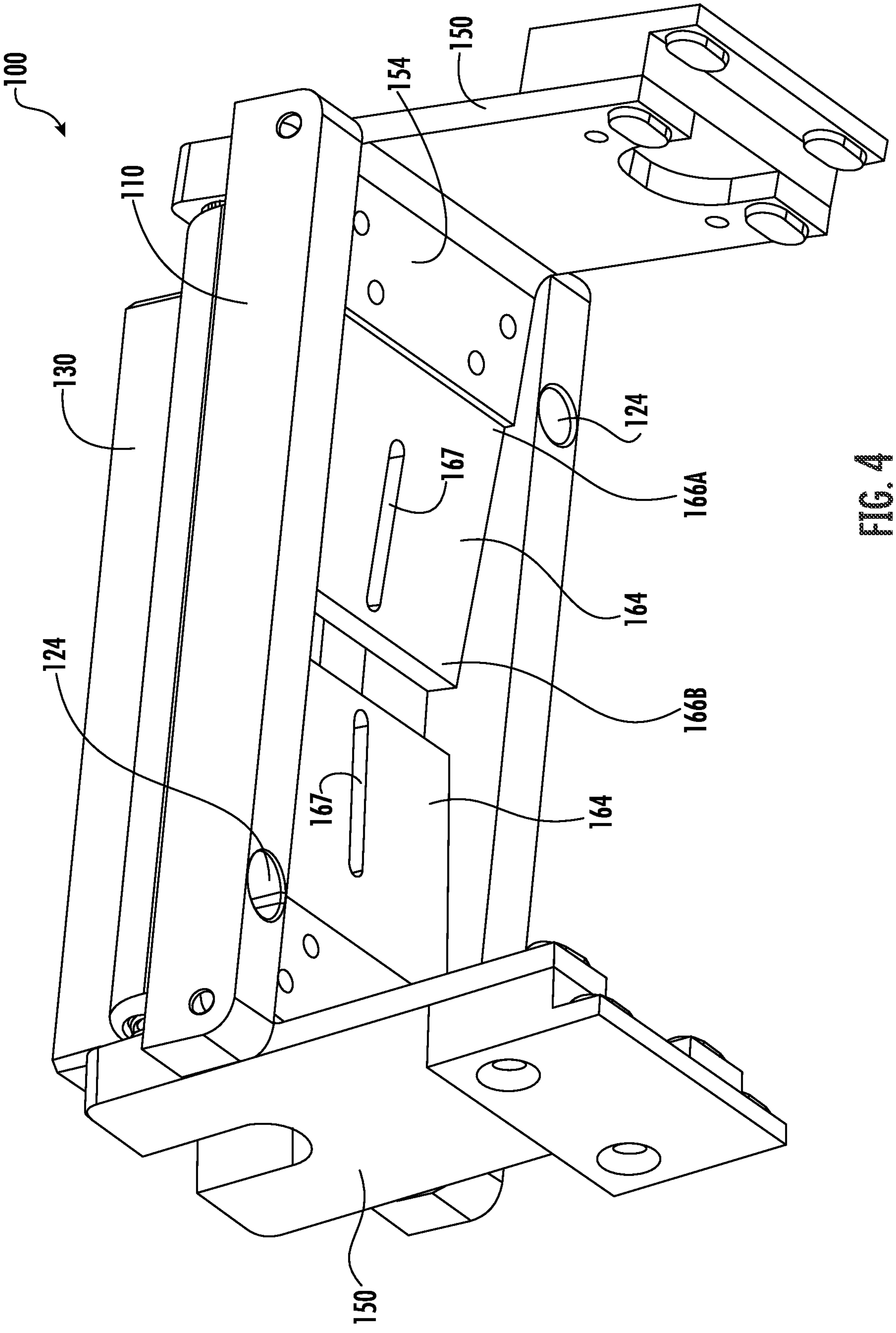
FIG. 4 is a bottom perspective view of the gripper tool of FIG. 3.
Figure 5:
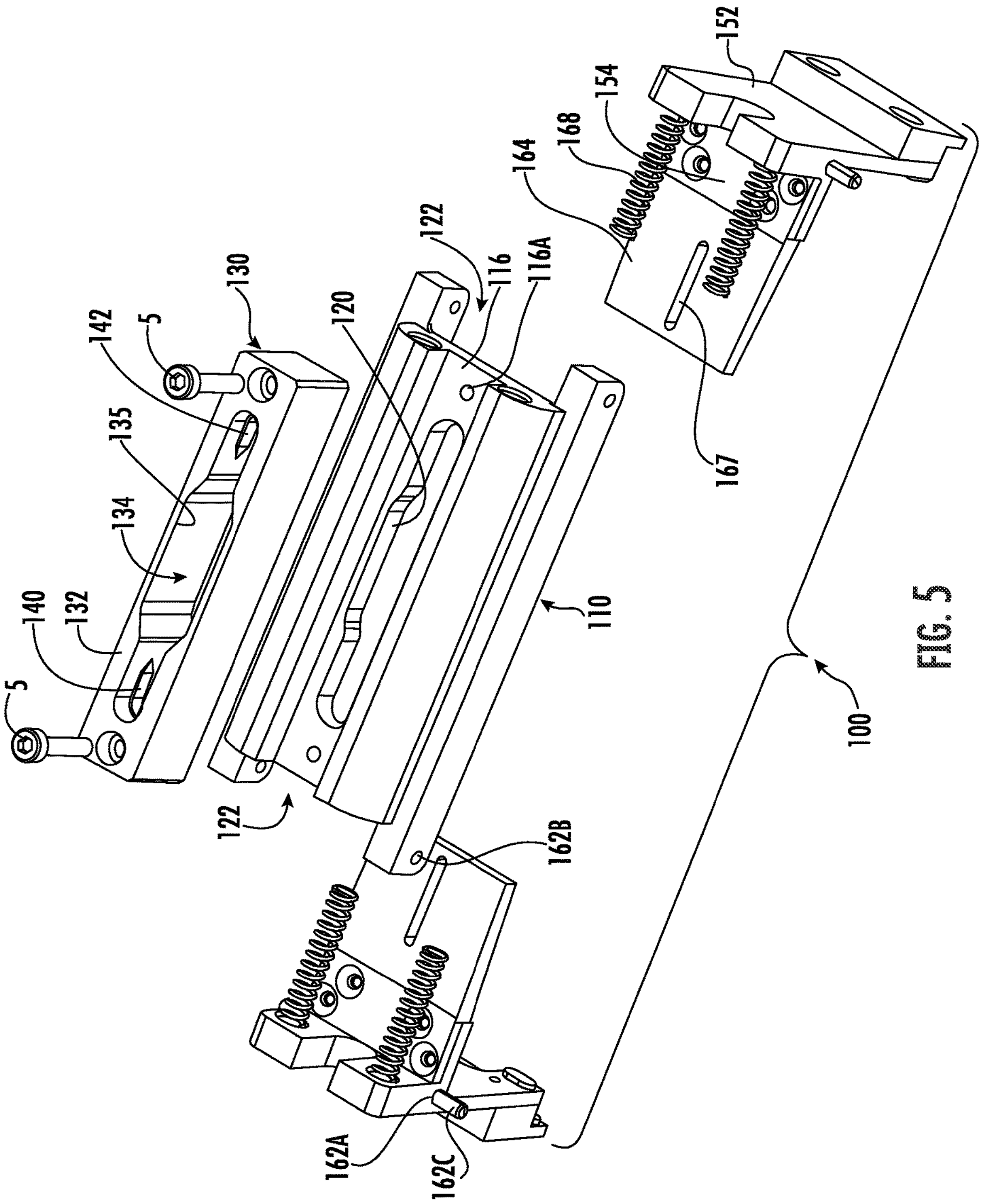
FIG. 5 is an exploded, top perspective view of the gripper tool of FIG. 3.

A cross-sectional view of the pipettor 72 is shown in FIG. 2. The pipettors 74, 76, 78 may be constructed in the same manner. Each pipettor 72, 74, 76, 78 includes a pipettor shaft 80, a liquid tube 82, an ejector sleeve 84, and an end wall 86. According to some embodiments, the pipettor shaft 80 is formed of metal.

Referring to FIG. 2, the pipettor shaft 80 defines a passage 80B therethrough that terminates at an opening 80E in a lower terminal end 80A of the pipettor shaft 80. A lower section 80F of the shaft 80 extends beyond the ejector sleeve 84. A pair of axially spaced apart, integral annular ribs 80CU and 80CL are located on the outer surface of the lower section 80F proximate the lower terminal end 80A. A midsection 80G of the lower section 80F extends axially between the ribs 80CU, 80CL. The ribs 80CU, 80CL and the midsection 80G define an annular slot or groove 81 therebetween. According to some embodiments, the outer diameter D1 (FIG. 2) of the ribs 80CU, 80CL is in the range of from about 0.5 to 1 mm greater than the outer diameter D2 of the midsection 80G (i.e., the bottom of the groove 81). According to some embodiments, the outer diameter D1 is in the range of from about 5.1 to 5.5 mm and the outer diameter D2 is in the range of from about 4.5 to 4.7 mm. The lower terminal end 80A of the shaft 80 may have a generally rounded shoulder. The pipettor shafts 80 of the pipettors 72, 74, 76 and 78 define pipettor axes P1-P1, P2-P2, P3-P3 and P4-P4 (FIG. 7), respectively.

The liquid tube 82 extends through the passage 80B such that a probe or tip section 82C thereof extends beyond the lower terminal end 80A a distance D4 to a lower terminal end 82A. The distance D4 (FIG. 2) can vary and, according to some embodiments, is in the range of from about 0 to 10 mm. A passage 82B extends through the liquid tube 82 to provide fluid communication between an end opening 82D and the liquid handler 40 (via the tubing 42). A liquid tight seal can be provided between the liquid tube 82 and the pipettor shaft 80 by the end wall 86.

The ejector sleeve 84 defines a passage and surrounds the pipettor shaft 80. The ejector sleeve 84 is slidable up and down the pipettor shaft 80 under the power of the actuator 58 (i.e., along the Z axis).

The actuator assemblies 72A, 74A, 76A and 78A can extend and retract (i.e., lower and raise) the pipettors 72, 74, 76 and 78, respectively, along the Z axis relative to the housing 64 and independently of one another. Additionally, each actuator assembly 72A-78A can slidably extend and retract the ejector sleeve 84 of its associated pipettor 72-78 down and up the length of the pipettor shaft 80 on which the ejector sleeve 84 is mounted.

Figure 7:
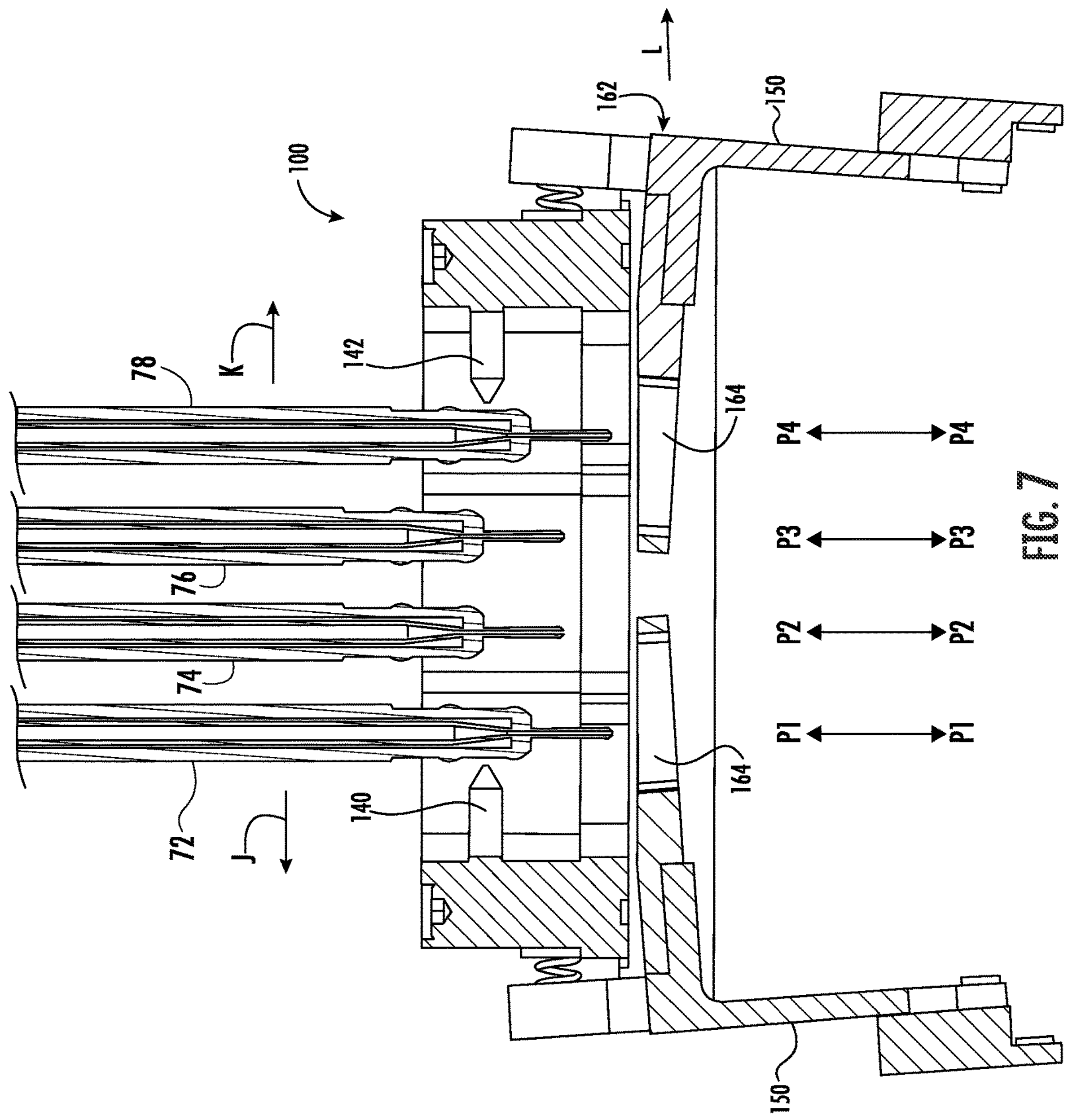
FIGS. 7-10 are fragmentary, cross-sectional views of the pipetting module and the gripper tool illustrating steps of the procedure for engaging and operating the gripper tool.
Figure 8:
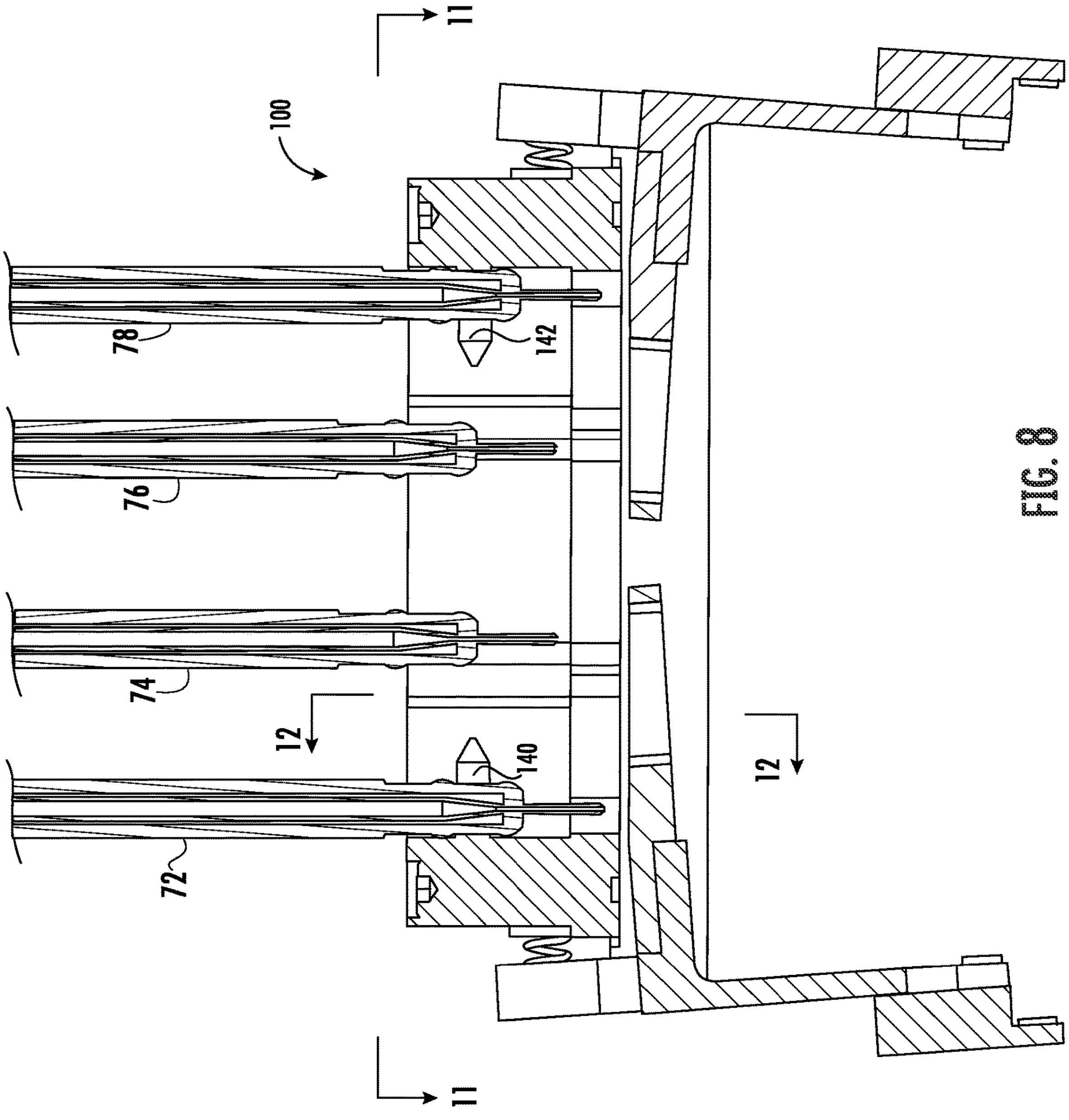

The actuator 56 can be used to selectively spread the pipettors 72-78 apart from one another along the Y axis. More particularly, the pipettors 72-78 can assume a laterally retracted position as shown in FIG. 7 wherein the pipettors 72-78 are positioned in relatively close proximity to one another. The actuator 56 can drive each pipettor 72, 74, 76 laterally (along the Y axis) away from the adjacent pipettor so that the pipettors 72-78 assume a laterally extended or expanded position as shown in FIG. 8. In the illustrated embodiment, the pipettors 72-78 are expanded leftward and rightward from the center. However, other arrangements may be used.

The lab tool system 101 includes a lab tool 100 in the form of a gripper tool. The gripper tool 100 is a module configured to be retrieved, transported, released, and operated using the pipetting module 60. The gripper tool 100 is configured to be selectively attached to and detached from the pipetting module 60.

The gripper tool 100 includes a tool body or frame 110, an integral adapter structure 130 mounted on top of the frame 110, and the gripper mechanism 151. The adapter structure 130 may be affixed to the frame 110 by any suitable technique, such as fasteners 5, adhesive, welding, or unitary molding or machining.

The tool frame 110 has a lateral axis L-L (FIG. 6) and opposed lateral ends 112A, 112B spaced apart along the lateral axis L-L. The tool frame 110 has an axial upper end 114A and lower end 114B. An adapter slot 116 and threaded adapter mount holes 116A are located on the upper end 114A. An elongate actuator through slot 120 extends between the upper and lower ends 114A, 114B. Opposed finger slots 122 are defined in the tool frame 110 at the lateral ends 112A, 112B. A pair of locator features in the form of recesses 124 (FIG. 4) are located on the underside of the frame 110.

Figure 11:
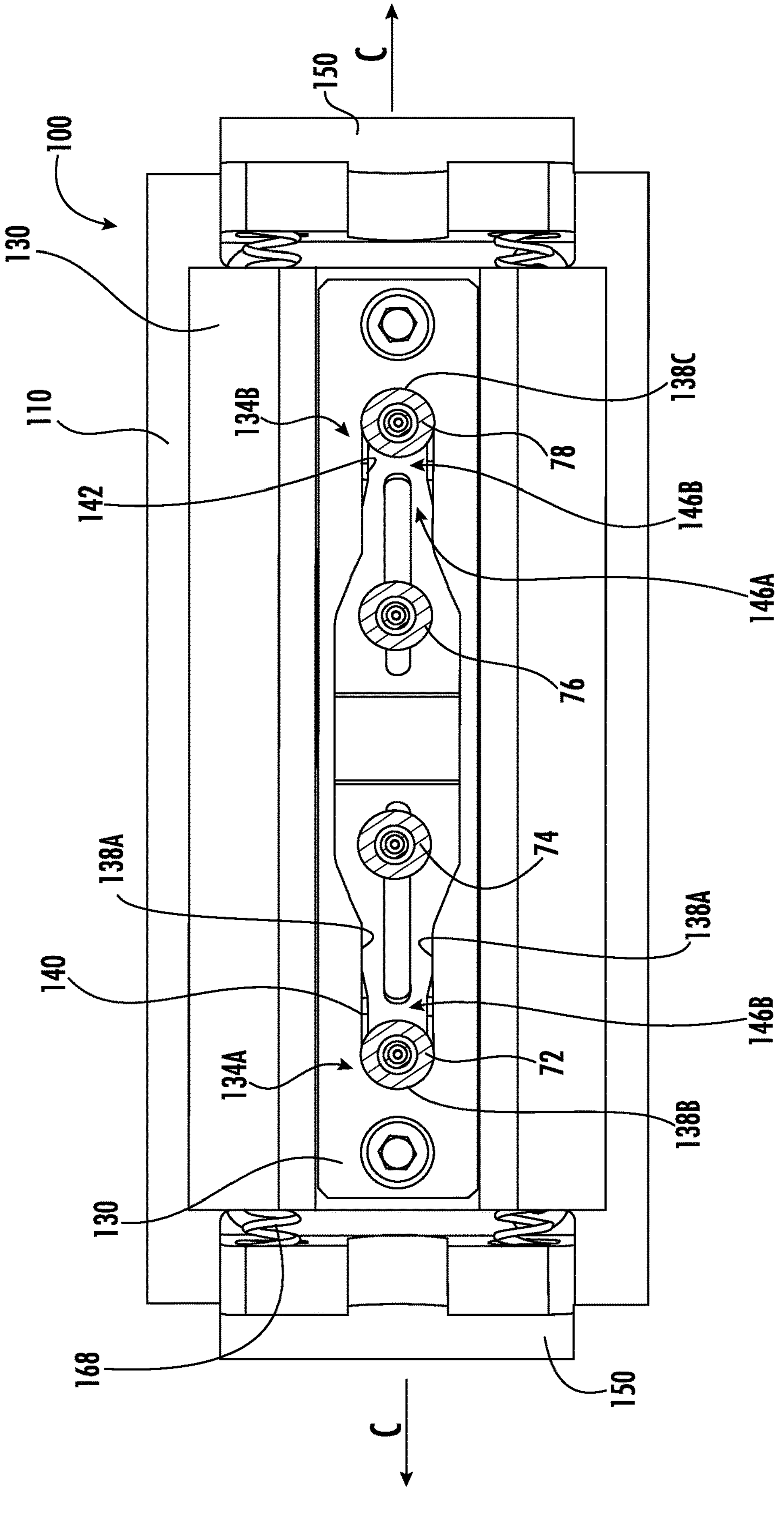
FIG. 11 is a cross-sectional view of the pipetting module and the gripper tool of FIG. 8 taken along the line 11-11 of FIG. 8.

The adapter structure 130 (FIGS. 5, 6, 11 and 12) includes an adapter body 132 having an elongate main slot 134 communicating with an elongate top opening 135. The slot 134 and the opening 135 are elongated along the Y axis. The slot 134 is defined by opposed side walls 138A and opposed end walls 138B and 138C (FIG. 11). The slot 134 defines a slot axis C-C.

A support flange 140 (herein referred to as the left support flange) and a support flange 142 (herein referred to as the right support flange) are provided on the ends 134A and 134B, respectively, of the slot 134 and extend laterally inwardly into the slot 134 from the walls 138A, 138B, 138C. Each support flange 140, 142 is generally U-shaped and defines a flange slot 146B and a sideward or lateral opening 146A communicating with the slot 146B. Each support flange 140, 142 has an end section 148A and opposed side sections 148B. The terminal ends 144 of the flanges 140, 142 may be tapered to assist ingress into the slots 146B. The lateral openings 146A of the support flanges 140, 142 are arranged in an opposed, facing relationship along the slot axis C-C. Each flange slot 146B defines an insertion axis D-D, E-E (FIG. 6) parallel to the axis C-C.

The adapter structure 130 may be formed of any suitable material(s) such as a moldable or machinable polymeric material. In some embodiments, the adapter structure 130 is formed of Ultra-High Strength polymer, polyetheretherketone (PEEK), polyetherimide (PEI), ULTEM™ resin, or aluminum. The adapter structure 130 may be formed using any suitable techniques, such as injection molding.

The gripper mechanism 151 includes a pair of opposed gripper fingers 150 and a pair of opposed actuator linkages 160, each associated with a respective one of the fingers 150. Each gripper finger 150 and its associated actuator linkage together form a gripper mechanism subassembly 153.

The gripper fingers 150 may be similarly or substantially identically constructed. Each gripper finger 150 includes a main leg 152 and a connector leg 154. The main leg 152 has opposed upper and lower ends 152A and 152B. The gripper fingers 150 may be formed of any suitable material, such as a rigid polymer or metal. Each finger 150 may also include an extension block 156 and/or engagement pads 158 (e.g., formed of a relatively soft elastomer).

The actuator linkages 160 may be similarly or substantially identically constructed. Each linkage 160 includes a hinge 162, an actuator leg 164, and one or more springs 168.

Each hinge 162 includes a finger pivot hole 162A (in the corresponding finger 150), a frame pivot hole 162B (in the corresponding end of the frame 110), and an axle rod 162C extending through the holes 162A, 162B to pivotally couple the finger to the frame 110 for rotation about a hinge axis H-H.

Each actuator leg 164 is a lever arm having a fixed end 166A secured to an associated one of the connector legs 154 (e.g., by fasteners). An opposing free end 166B of each actuator leg 164 projects into the space below the through slot 120. An elongate tip receiving slot 167 is defined in each actuator leg 164. Each actuator leg 164 may be formed of any suitable material, such as a rigid polymer or metal.

Figure 6:
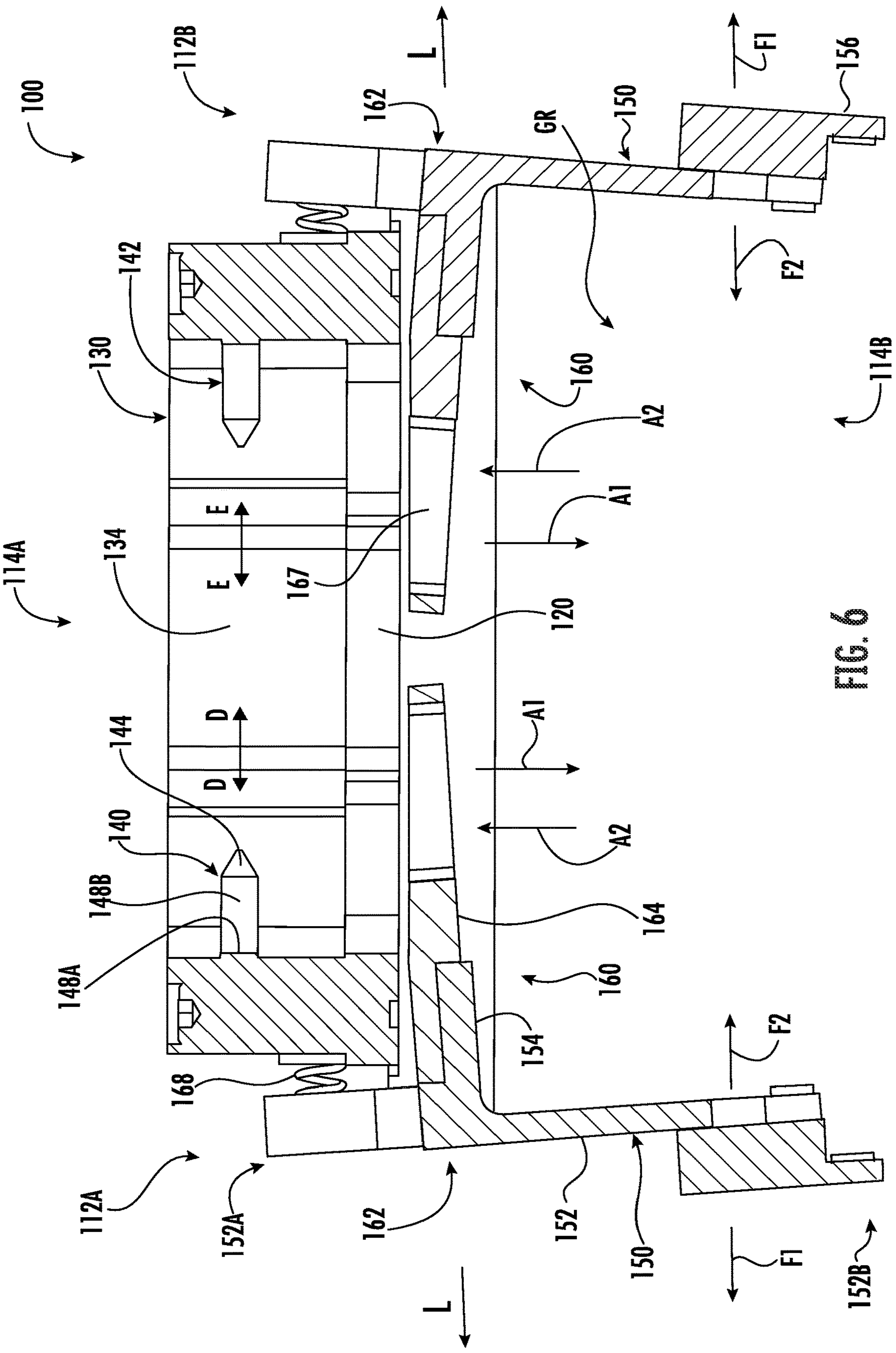
FIG. 6 is a cross-sectional view of the gripper tool of FIG. 3 taken along the line 6-6 of FIG. 3.

A gripper receiving region GR is defined between the fingers 150. The springs 168 and the hinges 162 are relatively arranged such that, when the receiving region GR is empty and the actuator legs 164 are not loaded (e.g., by pipettors, as discussed herein), the springs 168 will force the fingers 150 to assume a fully closed or ready position as shown in FIG. 7. When either actuator leg 164 is displaced downwardly (in a direction A1; FIG. 6) relative to the frame 110 (e.g., by pipettors, as discussed herein), the corresponding finger 150 is thereby pivoted or displaced outwardly (in a direction F1) about the hinge 162 toward an open position, away from the full closed position. When either actuator leg 164 is released from a displaced position, the actuator leg 164 moves in a direction A2 and the corresponding finger 150 is thereby pivoted or displaced inwardly (in a direction F2) about the hinge 162 toward the fully closed position by the return load of the springs 168.

In some embodiments, when an object (e.g., the lab object or lab member 90) is disposed in the receiving region GR and is wider that the space between the fingers 150 in the full closed position, the fingers 150 will assume a gripping position between the open position and fully closed position and will exert a gripping force (i.e., the spring force from the elastically deflected springs 168) on the object.

The locator dock 190 includes a dock body 192, mounting flanges 193, mounting holes 193A, a raised platform 194, opposed finger recesses 195, and locator features or posts 196.

The locator dock 190 is positioned within reach of the pipetting module 60. In some embodiments, the locator dock 190 is located at a prescribed location known to the controller 30. The locator dock 190 may be secured to the deck 12 using fasteners through the mounting holes 193A.

Exemplary operation of the system 10 and use of the gripper tool 100 in accordance with methods of the present technology will now be described with reference to FIGS. 7-12.

Initially, the gripper tool 100 may be seated on the locator dock 190 (as shown in FIG. 1) and the lab object 90 may be seated in a holder on the deck 12.

When the gripper tool 100 is seated on the locator dock 190, each finger 150 is received in a respective one of the finger recesses 195, and each of the locator posts 196 is received in a respective one of the locator recesses 124. In this way, the gripper tool 100 is positively located relative to the remainder of the liquid handling system 10 (e.g., the deck 12) for reference by the controller 30 when retrieving the gripper tool 100 from the locator dock 190 or depositing the gripper tool 100 onto the locator dock 190.

The lab object 90 may be a microwell plate containing one or more liquid samples, a tip box, a sample plate (e.g., a 384 well plate, 96 well plate, or deep well plate), a filtration device, or an individual sample tube, for example.

When it is desired to move the lab object 90, the pipetting module 60 and the gripper system 101 can be used as follows. According to some embodiments, the following procedure is executed via or by the controller 30 by selectively operating the drive actuators 53, 54, 55, 56, 57, and 58.

The pipetting module 60 is repositioned (using the drive system 50) on the frame 20 and with respect to the deck as needed to align the pipettor axes P1-P1, P2-P2, P3-P3 and P4-P4 with the slot 134. If needed, the controller 30 may adjust the height of the pipetting module 60 (e.g., lower the pipetting module 60).

With the pipettors 72-78 in the laterally retracted position, the controller 30 then drives the pipettors 72, 74, 76, 78 down (i.e., in the direction-Z) along the axes P1-P1, P2-P2, P3-P3, and P4-P4 such that the pipettor shafts 80 thereof are inserted into the slot 134 as shown in FIG. 7. The pipettors 72, 74, 76, 78 can be driven in this manner by (under the control of the controller 30) driving the housing 64 down with respect to the deck 12 (as shown) and/or by extending the individual pipettors 72, 74, 76, 78 downwardly with respect to the housing 64 using the actuator assemblies 72A, 74A, 76A, 78A.

Figure 12:
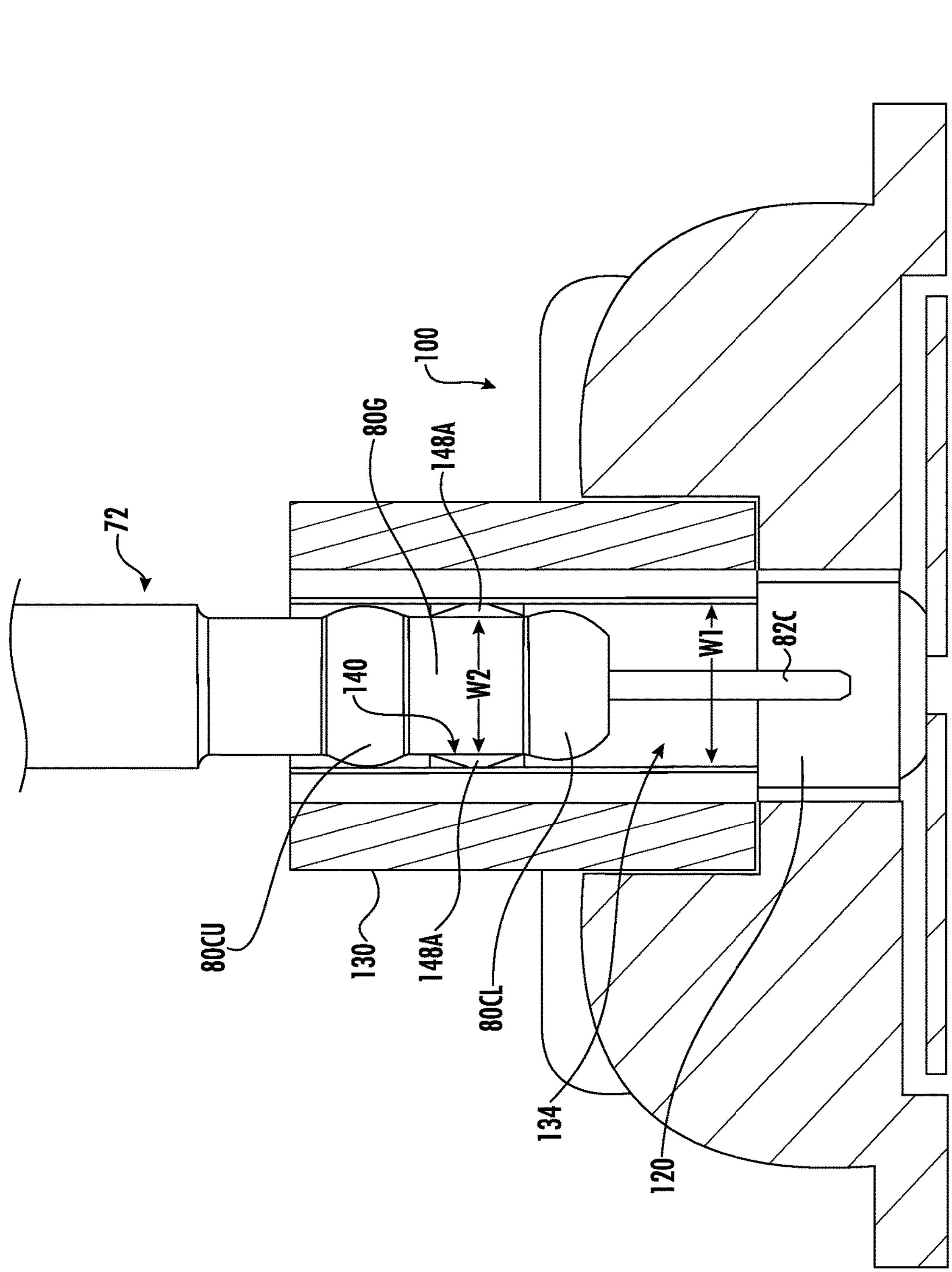
FIG. 12 is a cross-sectional view of the pipetting module and the gripper tool of FIG. 8 taken along the line 12-12 of FIG. 8.
Figure 13:
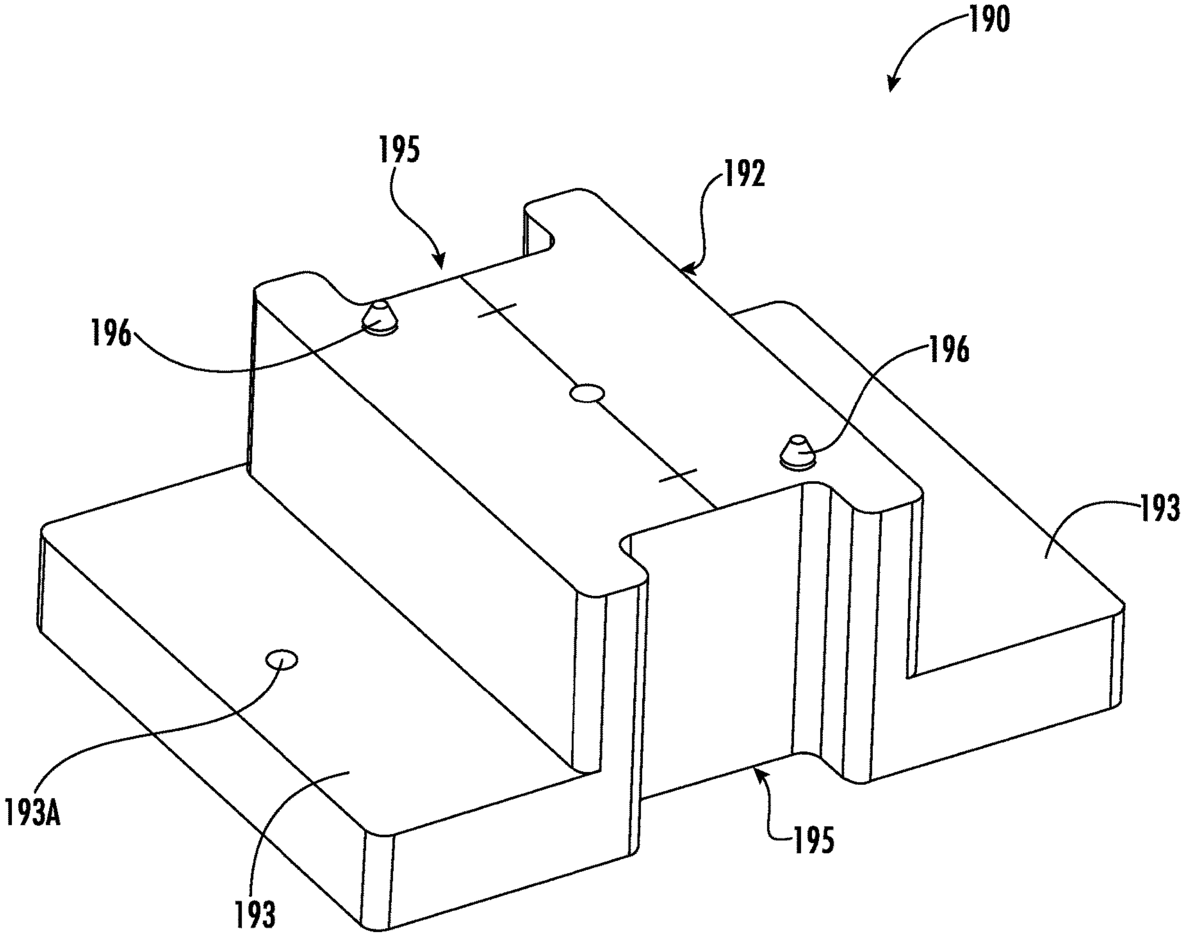
FIG. 13 a top perspective view of a locator dock forming a part of the laboratory liquid handling system of FIG. 1.

The controller 30 then actuates the module 60 to move the pipettors 72, 74, 76 into the laterally expanded position as shown in FIGS. 8, 11 and 12. In doing so, the pipettor 72 is slid laterally to the left in a lateral direction J (along the axis E-E) into the flange slot 146B of the support flange 140, and the pipettor 78 is slid laterally to the right in a lateral direction K (along the axis D-D) into the flange slot 146B of the support flange 142. The support flange 140 is thereby axially captured in the pipettor groove 81 of the pipettor 72 between the annular ribs 80CL, 80CU, and the support flange 142 is likewise axially captured in the pipettor groove 81 of the pipettor 78.

With reference to FIGS. 8, 11 and 12, it will be appreciated that the pipettors 72 and 78 are now prevented from being vertically or axially (i.e., along the Z axis) withdrawn from the flange slots 146B by the mechanical interlock between the support flanges 140, 142 and their annular ribs 80CL. That is, the support flanges 140, 142 and the annular ribs 80CL serve as cooperating interlock structures. The pipettors 72 and 78 are also prevented from being laterally withdrawn from the slots 146B by fixed, expanded width or spacing between the pipettors 72 and 78.

With the gripper tool 100 now securely mounted on the pipetting module 60, the controller 30 can lift and transport the gripper tool 100 using the module 60. The gripper tool 100 when mounted on the pipetting module 60 as shown in FIG. 8 is referred to herein as the mounted gripper tool 100.

The mounted gripper tool 100 can be operated by the controller 30 to grasp, transport and release or deposit one or more objects using the gripper mechanism 151. Operation of the gripper tool 100 in this manner is described below with reference to transport of the lab object 90. However, this description is illustrative, and it will be appreciated that any suitable object may be gripped and moved using the gripper tool 100.

The pipetting module 60 with the gripper tool 100 mounted thereon is moved (using the drive system 50) on the frame 20 to align the gripper tool 100 over the lab object 90. If needed, the controller 30 may adjust the position of the pipetting module 60 along the X, Y and/or Z axes.

Figure 9:
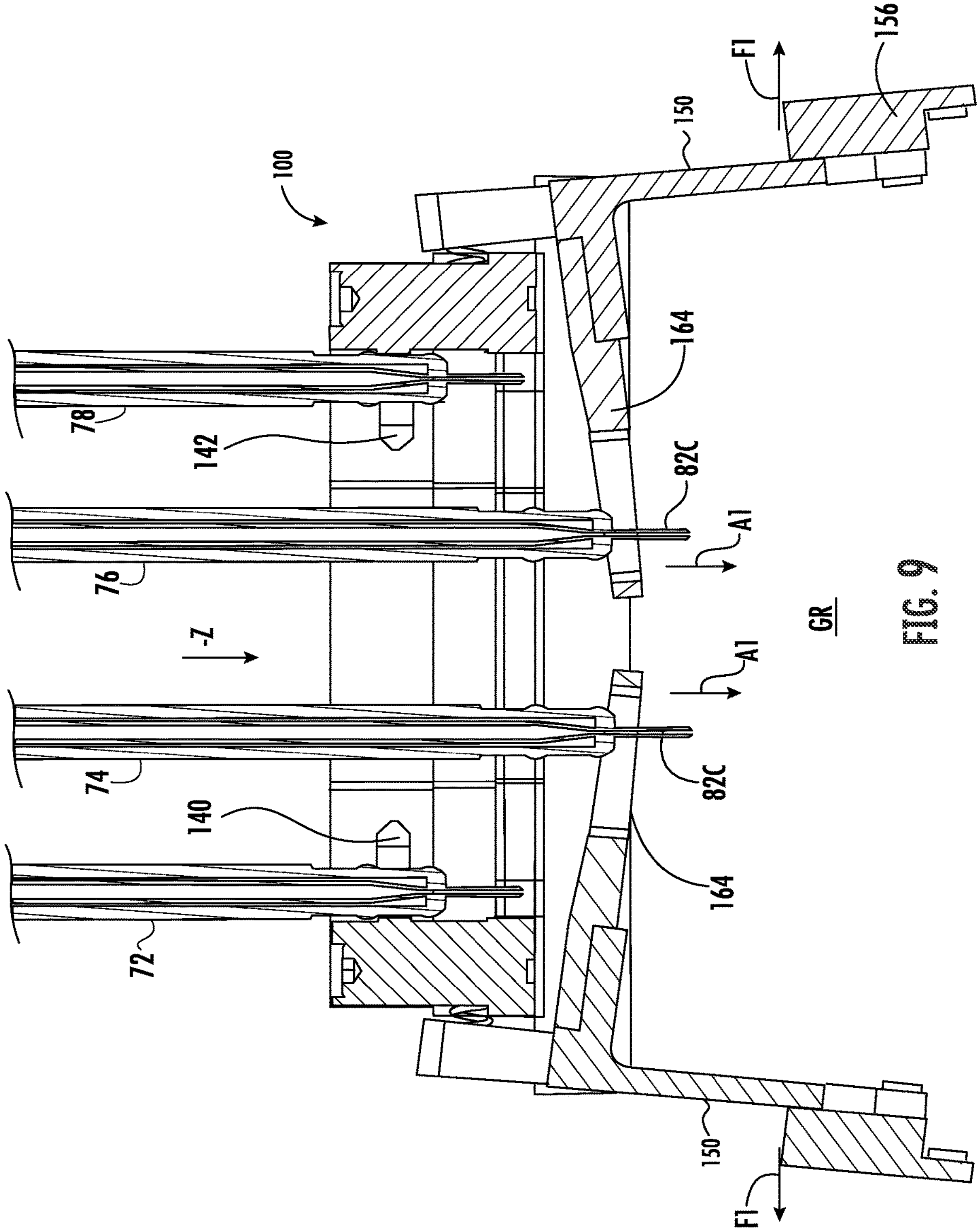

The controller 30 then drives the middle pipettors 74, 76 down (i.e., in the direction −Z) along the axes P2-P2, P3-P3 relative to the housing 64 and the frame 110 such that the pipettor shafts 80 thereof are extended and inserted through the slot 120 and the ends 80A of the pipettors 74 and 76 engage the actuator legs 164 and force the actuator legs 164 in directions A1, as shown in FIG. 9. The gripper mechanism 151 and the gripper fingers 150 are thereby transitioned to the open position as shown in FIG. 9. The tips 82C of the pipettors 74, 76 are received through the tip slots 167. The outer pipettors 72, 78 remain in their initial position and continue to secure the gripper tool 100 to the pipetting module 60.

The pipetting module 60 with the gripper tool 100 mounted thereon (and in the open position is then moved (using the drive system 50) on the frame 20 to place the gripper tool 100 over the lab object 90 such that the lab object 90 is received in the gripping region GR.

Figure 10:
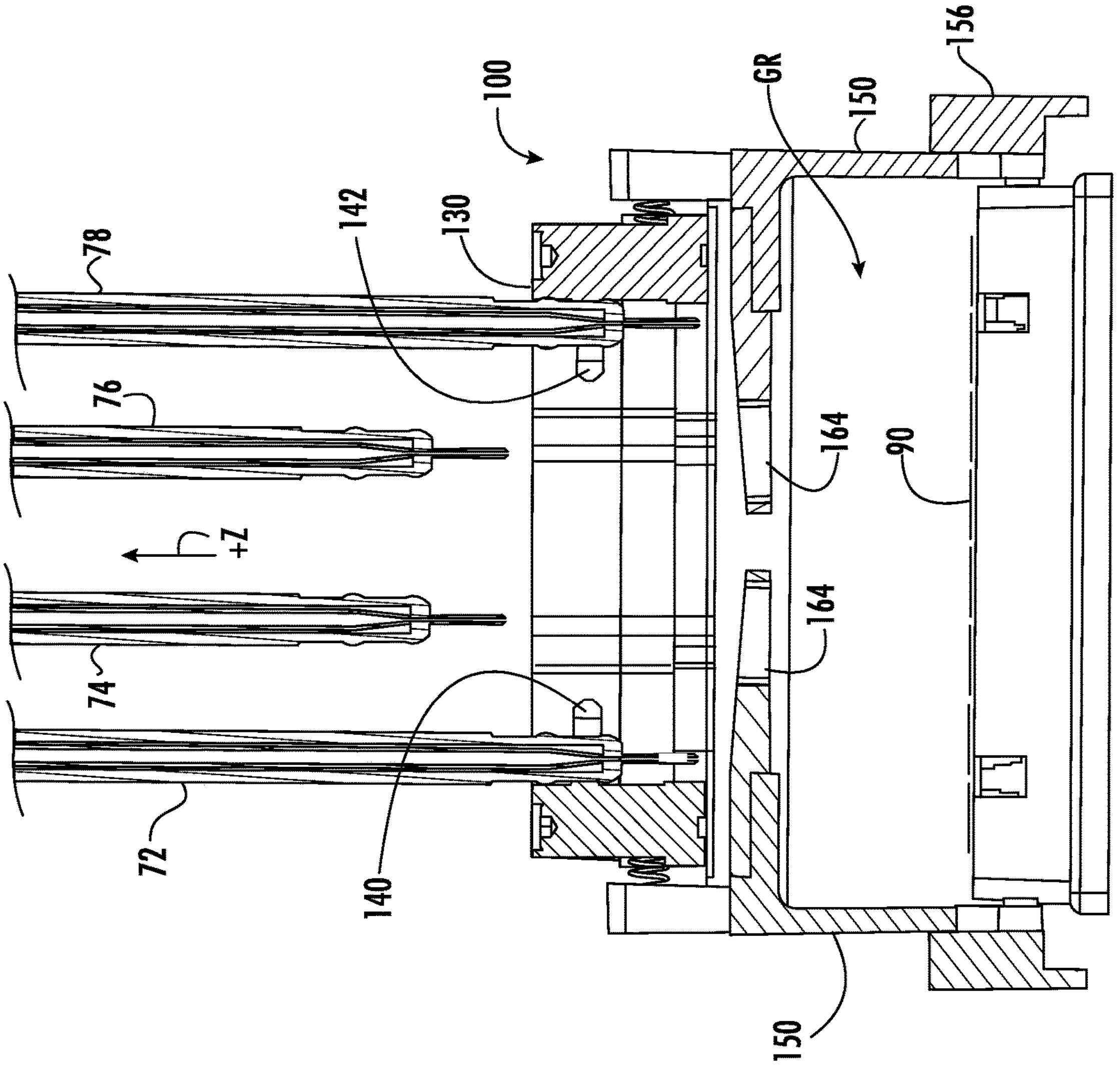

The controller 30 then drives the middle pipettors 74, 76 up (i.e., in the direction +Z) along the axes P2-P2, P3-P3 such that the pipettor shafts 80 thereof are withdrawn through the slot 120 and the pipettors 74 and 76 release the actuator legs 164 to return in directions A2 under the load of the springs 168, as shown in FIG. 10. The gripper mechanism 151 and the gripper fingers 150 are thereby transitioned to the gripping position as shown in FIG. 10. The outer pipettors 72, 78 remain in their initial position and continue to secure the gripper tool 100 to the pipetting module 60.

The lab object 90 is thereby gripped in and held or supported by the fingers 150. In some embodiments, the width or shape of the lab object 90 holds the gripper fingers 150 in a gripping position that is not the fully closed position. In that case, the springs 168 will continue to apply a persistent gripping force to the fingers 150. In some embodiments, the width or shape of the lab object 90 permits the gripper fingers 150 to return to the fully closed position with the lab object in the gripping region GR, and the fingers 150 continue to hold lab object 90 with an interlocking engagement.

The pipetting module 60 is moved (using the drive system 50) on the frame 20 and with respect to the deck as needed to position the lab object 90 where desired. If needed, the controller 30 may adjust the position of the pipetting module 60 along the X. Y and/or Z axes. Once the lab object 90 is in the desired location, the controller 30 drives the middle pipettors 74, 76 down (i.e., in the direction −Z) along the axes P2-P2, P3-P3 to force the actuator legs 164 in directions A1 and place the gripper mechanism 151 and the gripper fingers 150 in the open position. The lab object 90 is thereby released from the gripper tool 100 and the controller 30 can move the mounted gripper tool 100 away. The system 10 may be used in this manner to move and deposit the lab object 90 as desired. For example, the system 10 may move the lab object 90 from a first labware holder or station 92 on the deck 12 to a second labware holder or station 94 on the deck 12.

The foregoing procedures may be repeated multiple times with the same or different lab objects 90. The gripper tool 100 may then be dismounted from the pipetting module 60. The gripper tool 100 may be replaced on the locator dock 190 or deposited elsewhere.

The pipetting module 60 can be disengaged from the adapter structure 130 to release the gripper tool 100 by reversing the foregoing steps. More particularly, the controller 30 laterally retracts the pipettors 72-78 from the slots 146B and then raises the pipettors 72-78 from the slot 134.

The main slot 134 has a width W1 (FIG. 12) that is greater than the outer diameters D1 (FIG. 12) of the pipettor annular ribs 80CL, 80CU. Each flange slot 146B has a width W2

(FIG. 12) that is less than the diameter D1 (FIG. 2) of at least the upper annular rib 80CU and that is greater than the diameter D2 (FIG. 12) of the midsection 80G between the annular ribs 80CL, 80CU.

According to some embodiments and as illustrated, the slot insertion axes D-D, E-E (FIG. 11) and the insertion directions J, K are substantially perpendicular to the insertion direction −Z (e.g., horizontal or perpendicular to vertical). However, in some embodiments, the lateral insertion directions may be transverse but not perpendicular to the insertion direction (e.g., −Z) of the pipettors in the slot 134.

While U-shaped support flanges 140, 142 have been shown and described herein, other configurations of interlock structures may be employed in accordance with other embodiments of the technology.

The pipettors 72, 74, 76, 78 can continue to be used for pipetting using the tips 82C thereof when the pipettors 72, 74, 76, 78 are not installed in the adapter structures. Thus, the liquid handling system 10 can otherwise function in known or other desired manner. For example, the controller 30 can place one or more of the tips 82C of the pipettors 72, 74, 76, 78 in or over a volume of a liquid sample (e.g., in a cell or cells of a microwell plate or other container on the deck 12) and the liquid handler 40 can then aspirate and collect liquid from the volume or dispense a material into the volume. If liquid is collected, the controller 30 can thereafter move the pipettor(s) 72, 74, 76, 78 in or over another location (e.g., cells or containers different from those from which the liquid was collected) and dispense the liquid onto or into this new location.

In some embodiments or applications, the integral tips 82C are used to directly aspirate and dispense. In other embodiments or applications, disposable tips are mounted on the pipettor shafts over the integral tips 82C, and the disposable tips are used to aspirate and dispense. The pipettors 72, 74, 76, 78 may have configurations other than the configurations described and illustrated in the figures. For example, alternative pipettors may be adapted to mount disposable tips on their distal ends in place of the integral tips 82C.

As noted above, operations described herein can be executed by or through the controller 30. The actuators 53, 54, 55, 56, 57, 58 and other devices of the pipetting module 60 and/or the liquid handler 40 can be electronically controlled. According to some embodiments, the controller 30 programmatically executes some, and in some embodiments all, of the steps described. According to some embodiments, the movement of the pipetting module 60 to pick up, move and release the lab member is fully automatically and programmatically executed by the controller 30.

The gripper system 101 and the gripper tool 100 can be connected/disconnected to a pipetting module or arm to add the ability to move labware from any deck position to any deck position without compromising pipetting ability of the pipetting module or arm. The gripper tool can increase the functional capability of the pipetting module and replace ore obviate the need for a separate gripper module or arm. In this way, the gripper tool can significantly reduce cost of the instrument.

The gripper tool can be adapted to different labware by changing the configuration of fingers 150. Extension members 156 of different sizes and shapes may be installed on the fingers 150 to configure the gripper tool to grasp different types of labware such as relatively large well plates or relatively small individual sample tubes.

The controller 30 may be any suitable device for providing the functionality described herein. According to some embodiments, the controller 30 is an appropriately configured microprocessor-based personal computer.

Embodiments of the controller 30 logic may take the form of an entirely software embodiment or an embodiment combining software and hardware aspects, all generally referred to herein as a "circuit" or "module." In some embodiments, the circuits include both software and hardware and the software is configured to work with specific hardware with known physical attributes and/or configurations. Furthermore, controller 30 logic may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or other storage devices.

Figure 14:
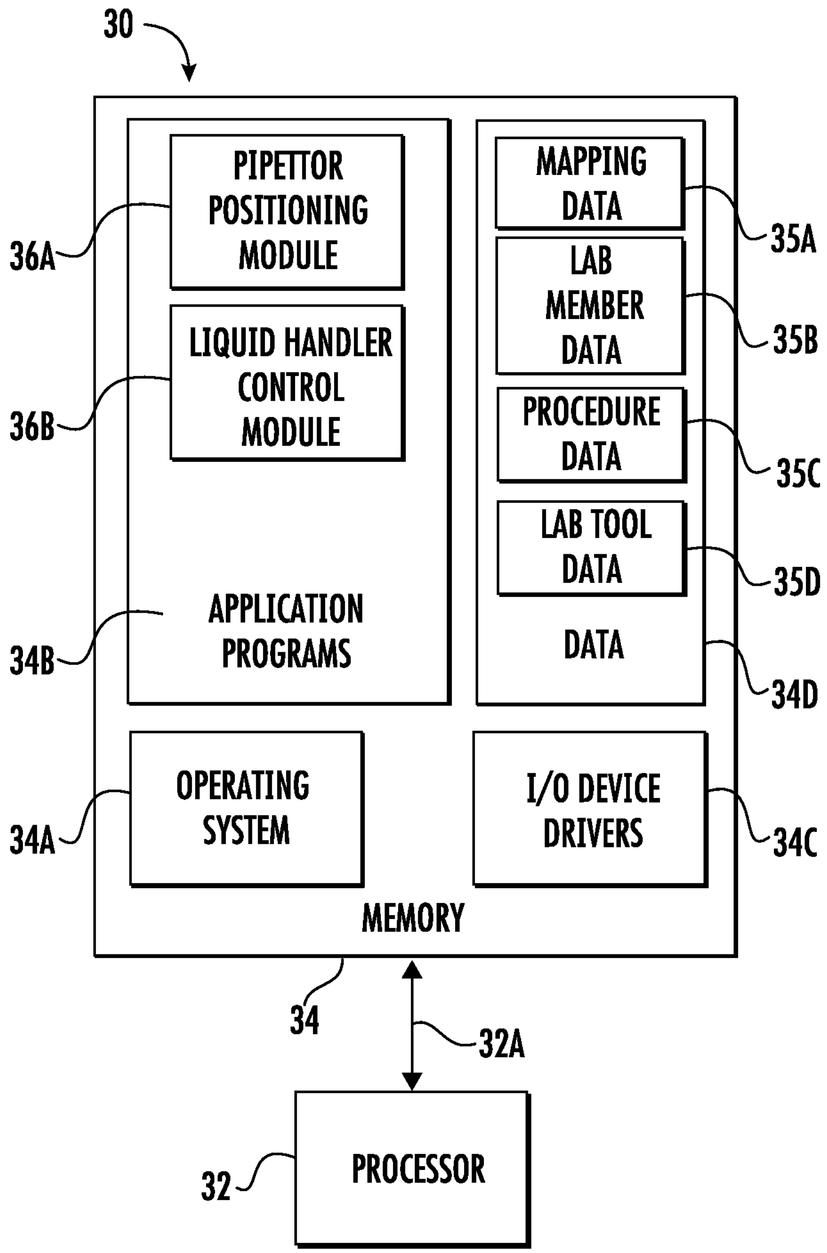
FIG. 14 is a schematic diagram representing a controller forming a part of the laboratory liquid handling system of FIG. 1.

FIG. 14 is a schematic illustration of a circuit or data processing system that can be used in the controller 30. The circuits and/or data processing systems may be incorporated in a digital signal processor 32 in any suitable device or devices. The processor 32 communicates with the HMI 33 and memory 34 via an address/data bus 32A. The processor 32 can be any commercially available or custom microprocessor. The memory 34 is representative of the overall hierarchy of memory devices containing the software and data used to implement the functionality of the data processing system. The memory 34 can include, but is not limited to, the following types of devices: cache, ROM, PROM, EPROM, EEPROM, flash memory, SRAM, and DRAM.

FIG. 14 illustrates that the memory 34 may include several categories of software and data used in the data processing system: the operating system 34A; the application programs 34B; the input/output (I/O) device drivers 34C; and data 34D. The data 34D can include equipment-specific data. FIG. 14 also illustrates that the data 34D can include mapping data 35A, lab member data 35B, procedure data 35C, and a lab tool data 35D. FIG. 14 also illustrates that application programs 34B can include a pipettor positioning module 36A and a liquid handler control module 36B.

The mapping data 35A can include data representing the positions (e.g., X, Y and Z coordinates) of objects or components in the work space of the system 10. The lab member data 35B can include data representing characteristics of a lab member or lab members (e.g., the labware 90). The procedure data 35C can include data representing a protocol or sequence of steps to execute the procedures described herein. The lab tool data 35D includes data representing characteristics of the lab tool 100.

The pipettor positioning module 36A can be used to control the actuators 53, 54, 55, 56, 57, 58, and the actuators 72A-78A, for example, to position and reposition the pipetting module 60, the pipettors 72-78, and the ejector sleeves 84. The liquid handler control module 36B can be used to control actuation of the liquid handler 40 to aspirate and/or dispense fluid.

As will be appreciated by those of skill in the art, the operating system 34A may be any operating system suitable for use with a data processing system, such as OS/2, AIX, DOS, OS/390 or System390 from International Business Machines Corporation, Armonk, NY, Windows CE, Windows NT, Windows95, Windows98, Windows2000 or other Windows versions from Microsoft Corporation, Redmond, WA, Unix or Linux or FreeBSD, Palm OS from Palm, Inc., Mac OS from Apple Computer, LabView, or proprietary operating systems. The I/O device drivers 34C typically include software routines accessed through the operating system 34A by the application programs 34B to communicate with devices such as I/O data port(s), data storage and certain memory components. The application programs 34B are illustrative of the programs that implement the various features of the data processing system and can include at least one application, which supports operations according to embodiments of the present technology. Finally, the data 34D represents the static and dynamic data used by the application programs 34B, the operating system 34A, the I/O device drivers 34C, and other software programs that may reside in the memory 34.

As will be appreciated by those of skill in the art, other configurations may also be utilized while still benefiting from the teachings of the present technology. For example, one or more of the modules 36A-B may be incorporated into the operating system, the I/O device drivers or other such logical division of the data processing system. Thus, the present technology should not be construed as limited to the configuration of FIG. 14, which is intended to encompass any configuration capable of carrying out the operations described herein. Further, one or more of the modules can communicate with or be incorporated totally or partially in other components, such as the controller 30.

Further embodiments may include an adapter structure or structures of a type or construction different than the adapter structure 130. For example, in some alternative embodiments an adapter structure as disclosed in U.S. Pat. No. 8,809,069 to Brady et al. is provided to selectively and releasably attach the lab tool to the pipettors of the pipetting module 60.

Further embodiments may include a lab tool including an integral active effector other than or in addition to a gripping mechanism.

The present technology has been described herein with reference to the accompanying drawings, in which illustrative embodiments of the technology are shown. In the drawings, the relative sizes of regions or features may be exaggerated for clarity. This technology may, however, be embodied in many different forms and should not be construed as limited to the embodiments set forth herein; rather, these embodiments are provided so that this disclosure will be thorough and complete, and will fully convey the scope of the technology to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this technology belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The term "automatically" means that the operation is substantially, and may be entirely, carried out without human or manual input, and can be programmatically directed or carried out.

The term "programmatically" refers to operations directed and/or primarily carried out electronically by computer program modules, code and/or instructions.

The term "electronically" includes both wireless and wired connections between components.

The term "monolithic" means an object that is a single, unitary piece formed or composed of a material without joints or seams.

Many alterations and modifications may be made by those having ordinary skill in the art, given the benefit of present disclosure, without departing from the spirit and scope of the technology. Therefore, it must be understood that the illustrated embodiments have been set forth only for the purposes of example, and that it should not be taken as limiting the technology as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described herein, what is conceptually equivalent, and also what incorporates the essential idea of the technology.

What is claimed is:

1. A laboratory liquid handling system comprising:
a pipetting module including:
  a first pipettor including:
    a first pipettor shaft; and
    a first fluid passage extending through the first pipettor shaft and terminating at a first orifice at an end of the first pipettor shaft; and a second pipettor connected to the first pipettor and including:

a second pipettor shaft; and a second fluid passage extending through the second pipettor shaft and terminating at a second orifice at an end of the second pipettor shaft;

a lab tool including:

at least one adapter structure configured to engage the first pipettor shaft to releasably mount the lab tool on the first pipettor shaft; and a gripper mechanism connected to the at least one adapter structure; and a drive system including:

at least one actuator; and a controller programmed with instructions to cause the at least one actuator to:

engage the first pipettor shaft with the at least one adapter structure to mount the lab tool on the pipetting module;

move the pipetting module to transport the lab tool mounted on the pipetting module;

move the second pipettor shaft relative to the lab tool mounted on the pipetting module to thereby operate the gripper mechanism; and disengage the first pipettor shaft from the at least one adapter structure to thereby release the lab tool from the pipetting module.

2. The laboratory liquid handling system of claim 1 wherein:

the gripper mechanism is a mechanical gripper mechanism including a gripper finger movable between an open position and a closed position; and the controller is programmed with instructions to cause the at least one actuator to move the second pipettor shaft relative to the lab tool mounted on the pipetting module to thereby move the gripper finger between the open position and the closed position.

3. The laboratory liquid handling system of claim 2 wherein:

the gripper mechanism includes:

an actuator linkage operable to move the gripper finger between the open position and the closed position; and the pipetting module is configured to selectively drive the second pipettor to displace the actuator linkage and thereby move the gripper finger between the open position and the closed position.

4. The laboratory liquid handling system of claim 3 wherein:

the gripper mechanism includes a lever arm joined to the gripper finger; and the pipetting module is configured to selectively drive the second pipettor to displace the lever arm and thereby move the gripper finger between the open position and the closed position.

5. The laboratory liquid handling system of claim 3 wherein:

the second pipettor includes a pipetting tip extending from the end of the second pipettor shaft;

the actuator linkage includes an engagement feature configured to engage the second pipettor shaft when the second pipettor is driven to displace the actuator linkage to move the gripper finger between the open position and the closed position; and the engagement feature includes a tip receiving slot defined therein to receive the pipetting tip.

6. The laboratory liquid handling system of claim 3 wherein the gripper mechanism includes at least one spring that biases the gripper finger toward the closed position.

7. The laboratory liquid handling system of claim 2 wherein:

the pipetting module includes a third pipettor connected to the first pipettor and including:

a third pipettor shaft; and a third fluid passage extending through the third pipettor shaft and terminating at a third orifice at an end of the third pipettor shaft;

the gripper mechanism includes:

a second gripper finger; and a second actuator linkage operable to move the second gripper finger between an open position and a closed position; and the pipetting module is configured to selectively drive the third pipettor to displace the second actuator linkage and thereby move the second gripper finger between its open position and its closed position.

8. The laboratory liquid handling system of claim 1 including a locator dock configured to support the lab tool and positively locate the lab tool relative to the laboratory liquid handling system.

9. The laboratory liquid handling system of claim 1 wherein:

the at least one adapter structure includes an interlock feature configured to laterally receive and interlock with the first pipettor shaft to releasably mount the lab tool on the first pipettor shaft; and the controller is programmed with instructions to cause the at least one actuator to:

move the first pipettor shaft laterally relative to the interlock feature to engage the first pipettor shaft with the interlock feature to mount the lab tool on the pipetting module; and move the first pipettor shaft laterally relative to the interlock feature to disengage the first pipettor shaft from the interlock feature to thereby release the lab tool from the pipetting module.

10. The laboratory liquid handling system of claim 9 wherein:

the pipetting module includes a third pipettor connected to the first pipettor and including:

a third pipettor shaft; and a third fluid passage extending through the third pipettor shaft and terminating at a third orifice at an end of the third pipettor shaft; and the at least one adapter structure includes a second interlock feature configured to laterally receive and interlock with the third pipettor shaft to releasably mount the lab tool on the third pipettor shaft; and the controller is programmed with instructions to cause the at least one actuator to:

move the third pipettor shaft laterally relative to the second interlock feature to engage the third pipettor shaft with the second interlock feature to mount the lab tool on the pipetting module; and move the third pipettor shaft laterally relative to the second interlock feature to disengage the third pipettor shaft from the second interlock feature to thereby release the lab tool from the pipetting module.

11. The laboratory liquid handling system of claim 9 wherein the first pipettor includes a pipettor interlock feature on the first pipettor shaft configured to interlock with the interlock feature of the at least one adapter structure to releasably mount the lab tool on the first pipettor shaft.

12. The laboratory liquid handling system of claim 11 wherein the pipettor interlock feature includes an annular rib.

13. The laboratory liquid handling system of claim 1 including a liquid handler fluidly connected to the first and second orifices and operable to dispense and/or aspirate a liquid through the first and second orifices.

14. A laboratory liquid handling system comprising:
- a pipetting module including:
  - a first pipettor including:
    - a first pipettor shaft; and
    - a first fluid passage extending through the first pipettor shaft and terminating at a first orifice at an end of the first pipettor shaft; and
  - a second pipettor connected to the first pipettor and including:
    - a second pipettor shaft; and
    - a second fluid passage extending through the second pipettor shaft and terminating at a second orifice at an end of the second pipettor shaft;
- a lab tool including:
  - at least one adapter structure configured to engage the first pipettor shaft to releasably mount the lab tool on the first pipettor shaft; and
  - a gripper mechanism connected to the at least one adapter structure; and
- a drive system including:
  - at least one actuator; and
  - a controller programmed with instructions to cause the at least one actuator to:
    - engage the first pipettor shaft with the at least one adapter structure to mount the lab tool on the pipetting module;
    - move the pipetting module to transport the lab tool mounted on the pipetting module;
    - move the second pipettor shaft to operate the gripper mechanism; and
    - disengage the first pipettor shaft from the at least one adapter structure to thereby release the lab tool from the pipetting module;
- wherein:
  - the gripper mechanism includes:
    - a gripper finger; and
    - an actuator linkage operable to move the gripper finger between an open position and a closed position;
    - the pipetting module is configured to selectively drive the second pipettor to displace the actuator linkage and thereby move the gripper finger between the open position and the closed position;
    - the second pipettor includes a pipetting tip extending from the end of the second pipettor shaft;
    - the actuator linkage includes an engagement feature configured to engage the second pipettor shaft when the second pipettor is driven to displace the actuator linkage to move the gripper finger between the open position and the closed position;
    - the engagement feature includes a tip receiving slot defined therein to receive the pipetting tip;
    - the at least one adapter structure includes an interlock feature configured to laterally receive and interlock with the first pipettor shaft to releasably mount the lab tool on the first pipettor shaft;
  - the controller is programmed with instructions to cause the at least one actuator to:
    - move the first pipettor shaft laterally relative to the interlock feature to engage the first pipettor shaft with the interlock feature to mount the lab tool on the pipetting module; and
    - move the first pipettor shaft laterally relative to the interlock feature to disengage the first pipettor shaft from the interlock feature to thereby release the lab tool from the pipetting module; and
  - the laboratory liquid handling system includes a liquid handler fluidly connected to the first and second orifices and operable to dispense and/or aspirate a liquid through the first and second orifices.

15. The laboratory liquid handling system of claim 14 wherein:
- the pipetting module includes a third pipettor connected to the first pipettor and including:
  - a third pipettor shaft; and
  - a third fluid passage extending through the third pipettor shaft and terminating at a third orifice at an end of the third pipettor shaft; and
- the at least one adapter structure includes a second interlock feature configured to laterally receive and interlock with the third pipettor shaft to releasably mount the lab tool on the third pipettor shaft; and
- the controller is programmed with instructions to cause the at least one actuator to:
  - move the third pipettor shaft laterally relative to the second interlock feature to engage the third pipettor shaft with the second interlock feature to mount the lab tool on the pipetting module; and
  - move the third pipettor shaft laterally relative to the second interlock feature to disengage the third pipettor shaft from the second interlock feature to thereby release the lab tool from the pipetting module.

16. The laboratory liquid handling system of claim 14 wherein:
- the pipetting module includes a third pipettor connected to the first pipettor and including:
  - a third pipettor shaft; and
  - a third fluid passage extending through the third pipettor shaft and terminating at a third orifice at an end of the third pipettor shaft;
- the gripper mechanism includes:
  - a second gripper finger; and
  - a second actuator linkage operable to move the second gripper finger between an open position and a closed position; and
- the pipetting module is configured to selectively drive the third pipettor to displace the second actuator linkage and thereby move the second gripper finger between its open position and its closed position.

17. A method for using a laboratory liquid handling system including a pipetting module and a drive system, the pipetting module including a first pipettor and a second pipettor connected to the first pipettor, the first pipettor including a first pipettor shaft and a first fluid passage extending through the first pipettor shaft and terminating at a first orifice at an end of the first pipettor shaft, and the second pipettor including a second pipettor shaft and a second fluid passage extending through the second pipettor shaft and terminating at a second orifice at an end of the second pipettor shaft, the drive system including at least one actuator, the method comprising:

providing a lab tool including:

at least one adapter structure configured to engage the first pipettor shaft, wherein the at least one adapter structure is configured to releasably mount the lab tool on the first pipettor shaft; and a gripper mechanism connected to the at least one adapter structure; and operating the drive system to cause the at least one actuator to:

engage the first pipettor shaft with the at least one adapter structure to mount the lab tool on the pipetting module;

move the pipetting module to transport the lab tool mounted on the pipetting module;

move the second pipettor shaft relative to the lab tool mounted on the pipetting module to thereby operate the gripper mechanism; and disengage the first pipettor shaft from the at least one adapter structure to thereby release the lab tool from the pipetting module.

* * * * *